US008056116B2

(12) United States Patent
Katoh et al.

(10) Patent No.: US 8,056,116 B2
(45) Date of Patent: Nov. 8, 2011

(54) CONTROL METHOD, CONTROL PROGRAM, AND CONTROL SYSTEM

(75) Inventors: Masafumi Katoh, Kawasaki (JP); Akihiro Inomata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1173 days.

(21) Appl. No.: 11/297,334

(22) Filed: Dec. 9, 2005

(65) Prior Publication Data
US 2007/0050850 A1 Mar. 1, 2007

(30) Foreign Application Priority Data
Aug. 30, 2005 (JP) .................................. 2005-248809

(51) Int. Cl.
G06F 17/30 (2006.01)
G06F 7/04 (2006.01)
H04L 29/06 (2006.01)
H04N 7/167 (2006.01)

(52) U.S. Cl. ................. 726/2; 726/4; 713/155; 380/229
(58) Field of Classification Search .................... 726/27, 726/2, 4; 713/155; 380/229
See application file for complete search history.

(56) References Cited

U.S. PATENT DOCUMENTS

| | | | | |
|---|---|---|---|---|
| 5,706,422 | A * | 1/1998 | Maruyama et al. ................ 714/4 |
| 5,796,990 | A * | 8/1998 | Erle et al. ........................... 716/4 |
| 6,597,920 | B2 * | 7/2003 | Yegani et al. ................. 455/512 |
| 7,103,151 | B2 * | 9/2006 | Lass et al. ........................ 379/37 |
| 7,123,739 | B2 * | 10/2006 | Staring et al. ................. 382/100 |
| 7,158,803 | B1 * | 1/2007 | Elliott ............................ 455/512 |
| 7,200,779 | B1 * | 4/2007 | Coss et al. ........................ 714/48 |
| 7,308,246 | B2 * | 12/2007 | Yamazaki et al. .......... 455/404.1 |
| 7,337,146 | B2 * | 2/2008 | Heelan et al. .................... 705/52 |
| 7,613,929 | B2 * | 11/2009 | Cohen et al. ................... 713/186 |
| 2001/0052082 | A1 * | 12/2001 | Kinoshita ...................... 713/201 |
| 2004/0139316 | A1 | 7/2004 | Kotani |
| 2005/0125674 | A1 | 6/2005 | Nishiki et al. |

FOREIGN PATENT DOCUMENTS

| | | |
|---|---|---|
| EP | 1 011 285 | 6/2000 |
| JP | 2000-184448 | 6/2000 |
| JP | 2002-183734 | 6/2002 |

(Continued)

OTHER PUBLICATIONS

Yoichiro Morita, et al., "Dynamic Security Provisioning Based on the Existence of Attendants," Proceedings of the 67th National Convention of IPSJ, Information Processing Society of Japan, Mar. 2, 2005, pp. 335-336.

(Continued)

Primary Examiner — Mohammad W Reza
(74) Attorney, Agent, or Firm — Staas & Halsey LLP

(57) ABSTRACT

This invention is to appropriately cope with abnormal states. A control method according to the present invention includes: identifying an abnormal level according to abnormal level reference data stored in advance in an abnormal level reference data storage, from context relating to abnormalities, which has been collected in advance and stored in a context storage; and converting the identified abnormal level to an authentication strength level according to a predetermined authentication strength level setting rule, and causing an authentication server to carry out an authentication processing according to the authentication strength level. By carrying out such a processing, it becomes possible to cause the authentication server to carry out an authentication having an authentication strength level corresponding to an abnormal state.

20 Claims, 19 Drawing Sheets

FOREIGN PATENT DOCUMENTS

| | | |
|---|---|---|
| JP | 2003-248661 | 9/2003 |
| JP | 2004-318372 | 11/2004 |
| JP | 2005-173805 | 6/2005 |
| JP | 2005-2279934 | 8/2005 |
| WO | 2004/051437 | 6/2004 |

OTHER PUBLICATIONS

Daisuke Nakamura, et al., "A Consideration of the Resource Management System for Supporting Offer of Disaster Information," The Special Interest Group Technical Reports of IPSJ, Information Processing Society of Japan, Mar. 29, 2002, vol. 2002, No. 32, pp. 55-60.

Japanese Office Action mailed Jan. 4, 2011 in corresponding Japanese Application No. 2005-248809.

Japanese Office Action mailed Mar. 22, 2011 in corresponding Japenese Application No. 2005-248809.

Japanese Office Action mailed Jul. 23, 2011 in corresponding Japenese Application No. 2005-248809.

Ramkumar M. Venkatesan et al., "Threat-Adaptive Security Policy," IPCCC, Jul. 2, 1997, pp. 525-531.

* cited by examiner

| PUBLIC CONTEXT | | | | |
|---|---|---|---|---|
| NW | TRAFFIC | SOCIETY | EARTHQUAKE | WEATHER |
| CONGESTION | — | — | — | HEAVY RAIN |

FIG.3A

| PERSONAL CONTEXT | | |
|---|---|---|
| USER ID | CRIME | HEALTH |
| A0001 | — | FIT OF CHRONIC DISEASE |
| A0002 | — | — |
| A0003 | — | — |
| A0004 | INVASION | — |
| ⋮ | ⋮ | ⋮ |

FIG.3B

|  |  | ABNORMAL LEVEL III | ABNORMAL LEVEL II | ABNORMAL LEVEL I |
|---|---|---|---|---|
| PUBLIC | NW | 50% IN CERTAIN REGION STOPS FUNCTION | 10% IN CERTAIN REGION STOPS FUNCTION OR HAS FAILURE | CONGESTION, VIRUS DETECTION, DETECTION OF DDoS ATTACK |
|  | TRAFFIC | STOPS OF MOST TRANSPORTATION SYSTEM, HUGE ACCIDENT | STOPS OF PLURAL TRAIN ROUTES, HUGE TRAFFIC JAM | TRAFFIC JAM, SINGLE ACCIDENT |
|  | SOCIETY | OUTBREAK OF WAR, SIMULTANEOUS TERRORIST ATTACK | SUDDEN AND LARGE FALL OF STOCKS | DISSOLUTION OF CONGRESS |
|  | EARTHQUAKE | EARTHQUAKE HAVING INTENSITY OF 6 OR MORE | EARTHQUAKE HAVING INTENSITY OF 4 TO 5 | EARTHQUAKE HAVING INTENSITY OF 3 OR LESS |
|  | WEATHER | LARGE HURRICANE | HEAVY SNOWFALL, HEAVY RAIN | HOT WEATHER |
| PERSONAL | CRIME | ROBBER INVASION, ABDUCTION | THREAT, STALKER APPEARANCE | PICK POCKET |
|  | HEALTH | SERIOUS CONDITION, SERIOUS INJURY | FIT OF CHRONIC DISEASE, INJURY | POLLEN ALLERGY |

FIG.4

| NW | TRAFFIC | SOCIETY | EARTHQUAKE | WEATHER |
|----|---------|---------|------------|---------|
| I  | —       | —       | —          | II      |

FIG.5A

| USER ID | CRIME | HEALTH |
|---------|-------|--------|
| A0001   | —     | II     |
| A0002   | —     | —      |
| A0003   | —     | —      |
| A0004   | III   | —      |
| ⋮       | ⋮     | ⋮      |

FIG.5B

|  | I. USER AUTHENTICATION | II. DEVICE AUTHENTICATION | III. ENVIRONMENT AUTHENTICATION |
|---|---|---|---|
| LEVEL 4 (HIGHEST) | PLURAL PERSONS | AUTHORIZATION BY PUBLIC AUTHORITY | CPU PERFORMANCE/ DISK CAPACITY |
| LEVEL 3 | TWO OR MORE TYPES IN LOWER LEVELS | SERIAL NUMBER +1 +2 | SPYWARE DETECTION CAPABILITY +1 +2 |
| LEVEL 2 | ONE TYPE OF BIOMETRIC AUTHENTICATIONS | MANUFACTURING DATE +1 | VIRUS DETECTION CAPABILITY +1 |
| LEVEL 1 (LOWEST) | ID/PASSWORD | MANUFACTURER | VERSION OF OS |
| LEVEL 0 | NONE | NONE | NONE |

FIG.6

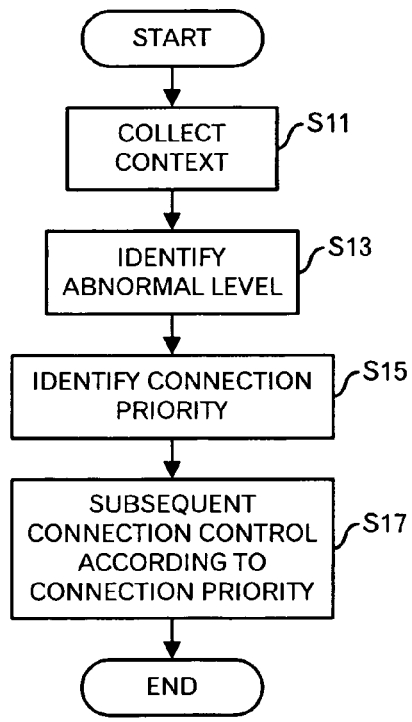

FIG.7

| CLASS | REQUESTING SERVICE | DEFAULT AUTHENTICATION STRENGTH LEVEL |
|---|---|---|
| MEDICAL | ELECTRONIC CARTE (PERSONAL HISTORY) | USER L2, DEVICE L3 |
| FINANCIAL | ELECTRIC COMMERCE UNDER 100 DOLLARS | USER L1 |
| FINANCIAL | ELECTRIC COMMERCE FROM 100 TO 1000 DOLLARS | USER L2, DEVICE L3 |
| FINANCIAL | ELECTRIC COMMERCE OVER 1000 DOLLARS | USER L3, DEVICE L3 |
| INFORMATION ACCESS | FREE SITE SUCH AS WEATHER, AND TRAFFIC | WITHOUT AUTHENTICATION |
| INFORMATION ACCESS | PAY SITE | USER L1 |
| PERSON TO PERSON (CALLING) | | USER L2 |

FIG.15

| SOURCE USER ID | CONNECTION DESTINATION USER ID |
|---|---|
| A0001 | B0001 |
| A0001 | C0001 |
| A0001 | D0001 |
| ⋮ | ⋮ |

FIG.16

|  |  | ABNORMAL LEVEL III | | ABNORMAL LEVEL II | | LEVEL I |
| --- | --- | --- | --- | --- | --- | --- |
|  |  | REGISTERED SOURCE AND DESTINATION | UNREGISTERED SOURCE OR DESTINATION | REGISTERED SOURCE AND DESTINATION | UNREGISTERED SOURCE OR DESTINATION |  |
| PUBLIC | NW | NO. OF TYPES TO BE APPLIED IS DECREASED BY 2 | NO. OF TYPES TO BE APPLIED IS INCREASED BY 2 | NO. OF TYPES TO BE APPLIED IS DECREASED BY 1 | NO. OF TYPES TO BE APPLIED IS INCREASED BY 1 |  |
|  | TRAFFIC | NO. OF TYPES TO BE APPLIED IS DECREASED BY 1 | NO. OF TYPES TO BE APPLIED IS INCREASED BY 2 | NO. OF TYPES TO BE APPLIED IS DECREASED BY 1 | NO. OF TYPES TO BE APPLIED IS INCREASED BY 1 |  |
|  | SOCIETY | NO. OF TYPES TO BE APPLIED IS DECREASED BY 2 | NO. OF TYPES TO BE APPLIED IS INCREASED BY 2 | LEVEL IS LOWERED BY 2 | NO. OF TYPES TO BE APPLIED IS INCREASED BY 1 | KEEP DEFAULT |
|  | EARTHQUAKE | NO. OF TYPES TO BE APPLIED IS DECREASED BY 2 | NO. OF TYPES TO BE APPLIED IS INCREASED BY 1 | LEVEL IS LOWERED BY 2 | NO. OF TYPES TO BE APPLIED IS INCREASED BY 1 |  |
|  | WEATHER | NO. OF TYPES TO BE APPLIED IS DECREASED BY 1 | NO. OF TYPES TO BE APPLIED IS INCREASED BY 2 | LEVEL IS LOWERED BY 1 | NO. OF TYPES TO BE APPLIED IS INCREASED BY 2 |  |
|  | CRIME | NO. OF TYPES TO BE APPLIED IS DECREASED BY 3 | NO. OF TYPES TO BE APPLIED IS DECREASED BY 3 | NO. OF TYPES TO BE APPLIED IS DECREASED BY 3 | NO. OF TYPES TO BE APPLIED IS DECREASED BY 3 |  |
| PERSONAL | HEALTH | NO. OF TYPES TO BE APPLIED IS DECREASED BY 3 | NO. OF TYPES TO BE APPLIED IS DECREASED BY 3 | NO. OF TYPES TO BE APPLIED IS DECREASED BY 3 | NO. OF TYPES TO BE APPLIED IS DECREASED BY 3 |  |

FIG.17

|  |  | ABNORMAL LEVEL III | | ABNORMAL LEVEL II | | LEVEL I |
| --- | --- | --- | --- | --- | --- | --- |
|  |  | REGISTERED SOURCE AND DESTINATION | UNREGISTERED SOURCE OR DESTINATION | REGISTERED SOURCE AND DESTINATION | UNREGISTERED SOURCE OR DESTINATION |  |
| PUBLIC | NW | USER L1 | USER L3 DEVICE L3 ENVIRONMENT L3 | USER L2 | USER L3 ENVIRONMENT L2 | DEPENDING ON SERVICE |
|  | TRAFFIC | USER L1 | USER L3 DEVICE L3 ENVIRONMENT L1 | USER L2 | USER L3 DEVICE L3 |  |
|  | SOCIETY | NONE | USER L4 DEVICE L4 | USER L2 | USER L3 DEVICE L3 |  |
|  | EARTHQUAKE | USER L1 | USER L4 DEVICE L4 | USER L1 | USER L3 DEVICE L3 |  |
|  | WEATHER | USER L1 DEVICE L2 | USER L3 DEVICE L3 | USER L1 DEVICE L2 | USER L2 DEVICE L2 |  |
|  | CRIME | WITHOUT AUTHENTICATION | WITHOUT AUTHENTICATION | WITHOUT AUTHENTICATION | WITHOUT AUTHENTICATION |  |
| PERSONAL | HEALTH | WITHOUT AUTHENTICATION | WITHOUT AUTHENTICATION | WITHOUT AUTHENTICATION | WITHOUT AUTHENTICATION |  |

FIG.18

CONTROL METHOD, CONTROL PROGRAM, AND CONTROL SYSTEM

TECHNICAL FIELD OF THE INVENTION

The present invention relates to an authentication control technique or an access control technique.

BACKGROUND OF THE INVENTION

In a network communication, because the party on the other end of the communication cannot be directly checked, a processing for checking whether or not the party on the other end of the communication is a person in question or a genuine object, that is, an authentication processing is important. Conventionally, in order to increase authentication strength, three-type integrated authentication including not only user authentication, and but also device authentication and environment authentication (here, which means checking whether or not a security function implemented and/or performance of the device to be used is sufficient) have been proposed (for example, refer to US 2004/0139316). This three-type integrated authentication is favorable in respect of increasing the authentication strength. However, in case of an urgent communication and/or various abnormal states, if strengthened authentication is always required, it is difficult to immediately process a request with high priority and/or carry out a processing with high priority in an abnormal state, such as a disaster. However, considering that a crime under a disaster frequently occurs, we can never omit the authentication.

In addition, JP-A-2003-248661 discloses a processing for changing an authentication level or the like according to user context information such as whether a requested processing is a private service for the user, whether a requested processing is a service requiring a small settlement, whether a requested processing is a service requiring a settlement within a predetermined price range, whether a requested processing is a service requiring a settlement with more than a predetermined amount, whether a processing to be carried out is an authentication processing to enter a room or pass through a gate or to access predetermined information, whether a former authentication was successful and the authentication processing was successively carried out within a predetermined time, and whether a service content for the user satisfies a predetermined condition. However, in this publication, an abnormal state is not detected at all and security related with the abnormal state is not considered.

As described above, the conventional technologies have a problem that there is no mechanism to dynamically change an authentication strength level and/or a communication priority (including access authority and the like) according to various abnormal states, and a connection setup procedure necessary at the abnormal state such as disasters cannot be carried out immediately. On the other hand, there is also a problem that uniformly lowering the authentication strength level allows a criminal to catch a chance.

SUMMARY OF THE INVENTION

Accordingly, an object of the present invention is to provide an authentication technique or an access control technique capable of appropriately coping with the abnormal states.

A control method according to a first aspect of the present invention includes: identifying an abnormal level according to abnormal level reference data stored in advance in an abnormal level reference data storage, from context relating to abnormalities, which has been collected in advance and stored in a context storage; and converting the identified abnormal level to an authentication strength level according to a predetermined authentication strength level setting rule, and causing an authentication server to carry out an authentication processing according to the authentication strength level. By carrying out such a processing, it becomes possible to cause the authentication server to carry out an authentication having an authentication strength level corresponding to an abnormal state. In other words, it is possible to carry out the dynamic authentication according to the abnormal state.

In addition, the predetermined authentication strength level setting rule may include a rule based on whether or not a combination of a calling party (or caller or requester) and a called party (or callee or information source) is preregistered. By adopting this rule, because it becomes possible to determine whether or not the combination of the calling party and the called party is a safe combination, it is possible to appropriately set or adjust the authentication strength level.

A control method according to a second aspect of the present invention includes: identify an abnormal level according to abnormal level reference data stored in advance in an abnormal level reference data storage, from context relating to abnormalities, which has been collected in advance and stored in a context storage; and converting the abnormal level to a connection priority including reject of connection setup request according to a predetermined connection control rule, and setting the connection priority to an equipment. Even when the authentication is not carried out, it is possible to set setting information representing whether or not the connection is allowed or the priority according to abnormal state.

In addition, the predetermined connection control rule may include a rule based on whether or not a combination of a calling party and a called party is preregistered.

In the control method according to the first or second aspect of the present invention, the identifying may be carried out by a policy management server, and the context storage may be provided in a context management server. Then, the control method according to the first or second aspect of the present invention may further include notifying the policy management server of data representing a change of the context relating to the abnormalities, which was stored into the context storage, from the context management server.

In addition, the control method according to the first or second aspect of the present invention may further include, in response to a request from the policy management server, transmitting, to the policy management server, data of the context relating to the abnormalities, which is stored into the context storage, from the context management server.

Furthermore, in the control method according to the first or second aspect of the present invention, the identifying may be carried out by the context management server, and the converting and causing or the setting may be carried out by the policy management server. Then, the control method according to the first or second aspect of the present invention may further include transmitting the abnormal level identified in the identifying from the context management server to the policy management server.

In addition, the aforementioned transmitting may be carried out by the context management server in response to a request from the policy management server.

In addition, the control method according to the first aspect of this invention may further comprise lowering the authentication strength level when a connection request is an emergency message. As for a connection request, which is apparent to be handled urgently, such as a notice to the police office, the authentication strength level may be lowered, for example, the authentication may not be carried out. In the same manner, the control method according to the second aspect of the present invention may further include compulsively accepting a connection request when the connection request is an emergency message.

In addition, the rule based on whether or not a combination of a calling party and a called party is preregistered may include a rule that the authentication strength level is lowered when the combination of the calling party and the called party has been registered, compared with a case when the combination of the calling party and the called party has not been registered. Thus, when the combination is preregistered, the necessity of the communication is high especially at an abnormal time, and the authentication strength level is set to be low in order to quickly handle the call under the abnormal state. In contrast, when the combination of the calling party and the called party is not preregistered, the authentication strength level may be set to be high, in order to exclude illegal access.

In the same manner, the rule based on whether or not a combination of a calling party and a called party is preregistered may include a rule that the connection priority is increased when the combination of the calling party and the called party has been registered, compared with a case when the combination of the calling party and the called party has not been registered.

Furthermore, the aforementioned authentication strength level may be defined by using at least one of a user authentication, a device authentication, and an environment authentication. The environment authentication is at least one of a type of an operating system, a version of an operating system, a virus detection capability, a phishing detection capability, and a device performance or capacity, for example.

In addition, the aforementioned predetermined authentication strength level setting rule may define heightening or lowering a default authentication strength level. Then, when the authentication strength level is lowered, the number of the types of authentication defined for the authentication strength level may be reduced, and when the authentication strength level is heightened, the number of the types of authentication defined for the authentication strength level may be increased.

Moreover, the aforementioned predetermined authentication strength level setting rule may define heightening or lowering a default authentication strength level. Then, when the authentication strength level is lowered, a level in the type of a predefined authentication to be used may be lowered, and when the authentication strength level is heightened, a level in the type of the predefined authentication to be used may be heightened.

In addition, the aforementioned predetermined authentication strength level setting rule may be defined to select one of authentication patterns respectively registered in association with predefined cases including an abnormal level as a condition.

Furthermore, the authentication server may include individual servers, each carrying out an authentication processing required for each authentication type or level. Then, the aforementioned converting and causing or setting may include selecting an individual server for the authentication type or level corresponding to the identified authentication strength level, by the policy management server that carries out the converting and causing or the setting.

In addition, the control method according to the first or second aspect of the present invention may further include transmitting a request of authentication information required in the identified authentication strength level to a terminal of a connection request source by the policy management server; and transmitting authentication information received from the terminal of the connection request source to the selected individual server by the policy management server.

Moreover, the control method according to the first or second aspect of the present invention may further include transmitting an authentication request to the selected individual server by the policy management server; and transmitting a request of necessary authentication information to the terminal of the connection request source by the policy management server.

It is possible to create a program for causing a computer to execute the aforementioned method according to this invention, and this program is stored in a storage medium or a storage device such as a flexible disk, a CD-ROM, an optical magnetic disk, a semiconductor memory, and a hard disk. Further, the program may be distributed as a digital signal through a network. Incidentally, intermediate processing results are temporarily stored in a storage device such as a main memory.

BRIEF DESCRIPTION OF THE DRAWINGS

FIGS. 3A and 3B are diagrams showing an example of a context storage;

FIG. 4 is a diagram showing an example of a reference table of abnormal levels;

FIGS. 5A and 5B are diagrams showing an example of an abnormal level data storage;

FIG. 6 is a diagram showing an example of authentication strength levels;

FIG. 7 is a diagram showing a second processing overview according to the embodiment of the present invention;

FIG. 15 is a diagram showing an example of a default authentication strength level table;

FIG. 16 is a diagram showing an example of a sending and receiving registration table;

FIG. 17 is a diagram showing an example of an authentication strength level-changing table;

FIG. 18 is a diagram showing an example of an authentication strength level setting table;

DETAILED DESCRIPTION OF THE PREFERRED EMBODIMENTS

Figure 1:
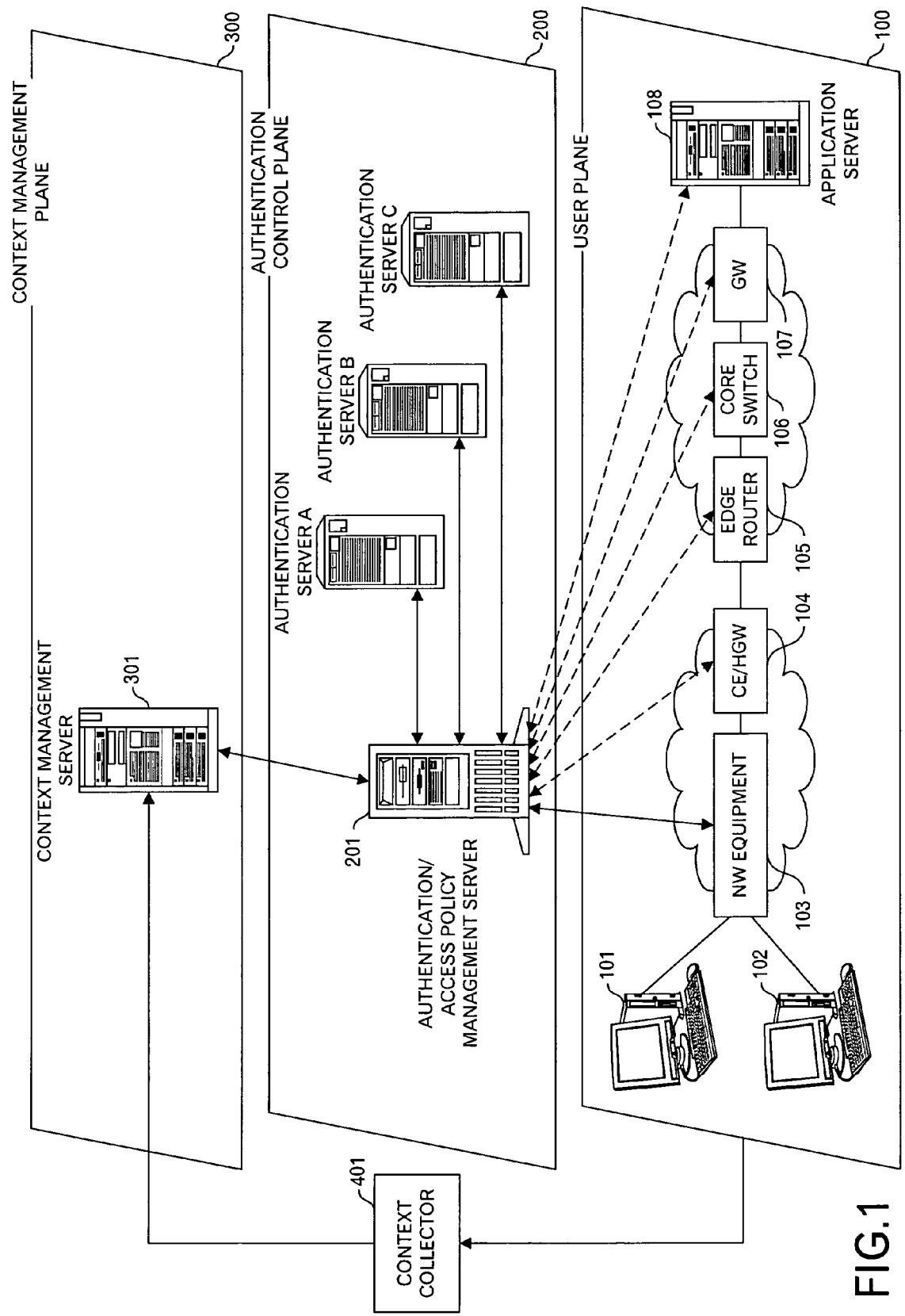
FIG. 1 is a diagram schematically showing a system according to an embodiment of the present invention.

FIG. 1 is a diagram schematically showing a system according to one embodiment of the present invention. The system according to the present embodiment is composed of three planes including a user plane 100, an authentication control plane 200, and a context management plane 300. The user plane 100 includes various equipments connected to a network LAN (local area network), HN (home network), and WAN (wide area network). In an example of FIG. 1, a network (NW) equipment 103 and a CE (customer edge)/HGW (home gateway) 104 are connected to the LAN or HN, and plural user terminals 101 and 102, which are, for example, personal computers, are connected to the NW equipment 103. In addition, an edge router 105, a core switch 106 and a GW (gateway) 107 are connected to the WAN, the CE/HGW 104 is connected to the edge router 105, and the GW 107 is connected to plurality application servers 108 that provide specific services. There are a lot of equipments and networks belonging to the user plane 100, although not shown in FIG. 1. In addition, as necessary at a scene where the authentication is needed or a connection is made, an equipment belonging to the user plane 100 can cooperate with an authentication/access policy management server 201 described below.

The authentication control plane 200 includes the authentication/access policy management server 201 and plural authentication servers (authentication servers A to C in FIG. 1). The authentication/access policy management server 201 carries out an authentication processing according to authentication strength levels while cooperating with plural authentication servers. Incidentally, the authentication/access policy management server 201 and plural authentication servers are connected to networks in the user plane 100, and the authentication/access policy management server 201 carries out a processing in response to a request from the equipments belonging to the user plane 100, and carries out a required instruction outputs or settings for the equipment belonging to the user plane 100. In addition, plural authentication servers communicate with, for example, user terminals 101 and 102, and carries out various authentication processings. Incidentally, for example, the authentication server A carries out the user authentication, the authentication server B carries out the device authentication, and the authentication server C carried out the environment authentication. Besides, an authentication server may be provided for each type of authentication techniques, such that the authentication server A carries out a password authentication and the authentication server B carries out a biometric authentication.

The context management plane 300 includes a context management server 301, and the context management server 301 receives collected data of the contexts from a context collector 401 that collects data of phenomenon occurring in the user plane 100, traffic, societies, weather and the like, and data of phenomenon occurring to registered users. The context management server 301 may identify an abnormal level, cooperating with the authentication/access policy management server 201.

The context collector 401 may be various sensors. The context collector 401 may be various devices such as (1) system for collecting failure occurrence states, congestion states, virus propagation states and the like on the networks in the user plane 100, (2) system for receiving data concerning operation states from a train operation managing system, and/or an apparatus for collecting operation states by using a combination of an IC tag attached to each train or each shuttle bus, an IC tag reader located at each station and each stop and a timetable, (3) system for collecting vehicle movement states from velocity sensors on roads, (4) system for collecting accident information from a system that provides other traffic information, (5) system for collecting specific types of news (war, disturbance, terrorism, and dissolution of congress) from reliable news sources provided on the Internet and so on, (6) seismographs, (7) devices for collecting specific weather data such as hurricane, snowfall, earthquake and so on from hyetometers, barometers, thermometers, hygrometers, anemometers, a meteorological administration homepage and so on, (8) devices for collecting data concerning fire occurrence states from a fire alarm, a smoke detector, a smell sensor and so on, (9) system for collecting data related to variations of stock prices from a stock market system, (10) system for collecting information concerning whether a registered user's house is invaded, that can be obtained from a home security system, (11) system for collecting state data concerning movement of products or persons from IC tags attached to the products, registered users, and persons associated with the registered users, and IC tag readers located at various places, and detecting possibility of robbery or abduction, (12) system for collecting alarms (alarms concerning occurrences of a crime (such as a threat), a disease (such as a fit), and an injury) generated from alarming portable terminals, and (13) system for collecting measurement results of a body temperature, a pulse, and a blood pressure, and detecting specific diseases.

On the basis of (2), (3) and (4), stops of most transportation system, a huge accident, stops of plural train routes, a huge traffic jam having a predetermined level, a traffic jam having a predetermined second level, a single accident and so on are detected. On the basis of (5) and (9), an outbreak of war, a simultaneous terrorist attack, a sudden fall of stock, dissolution of congress, and the like are detected. On the basis of (6), outbreak of an earthquake having an intensity of more than or equal to six, outbreak of an earthquake having an intensity of 4 to 5, outbreak of an earthquake having an intensity of 3 or less and the like a redetected. On the basis of (7) and the like, large hurricanes having a predetermined level, heavy snowfall or rain having a predetermined level, a hot weather satisfying a predetermined criterion and so on are detected. On the basis of (8), a scale of fire is detected. On the basis of (10), (12), (13) and the like, a robber invasion, abduction, a threat, a stalker appearance, a pickpocket appearance, a serious condition, a serious injury, a fit of a chronic disease, an injury, a pollinosis (pollen allergy) and the like are detected.

Figure 2:
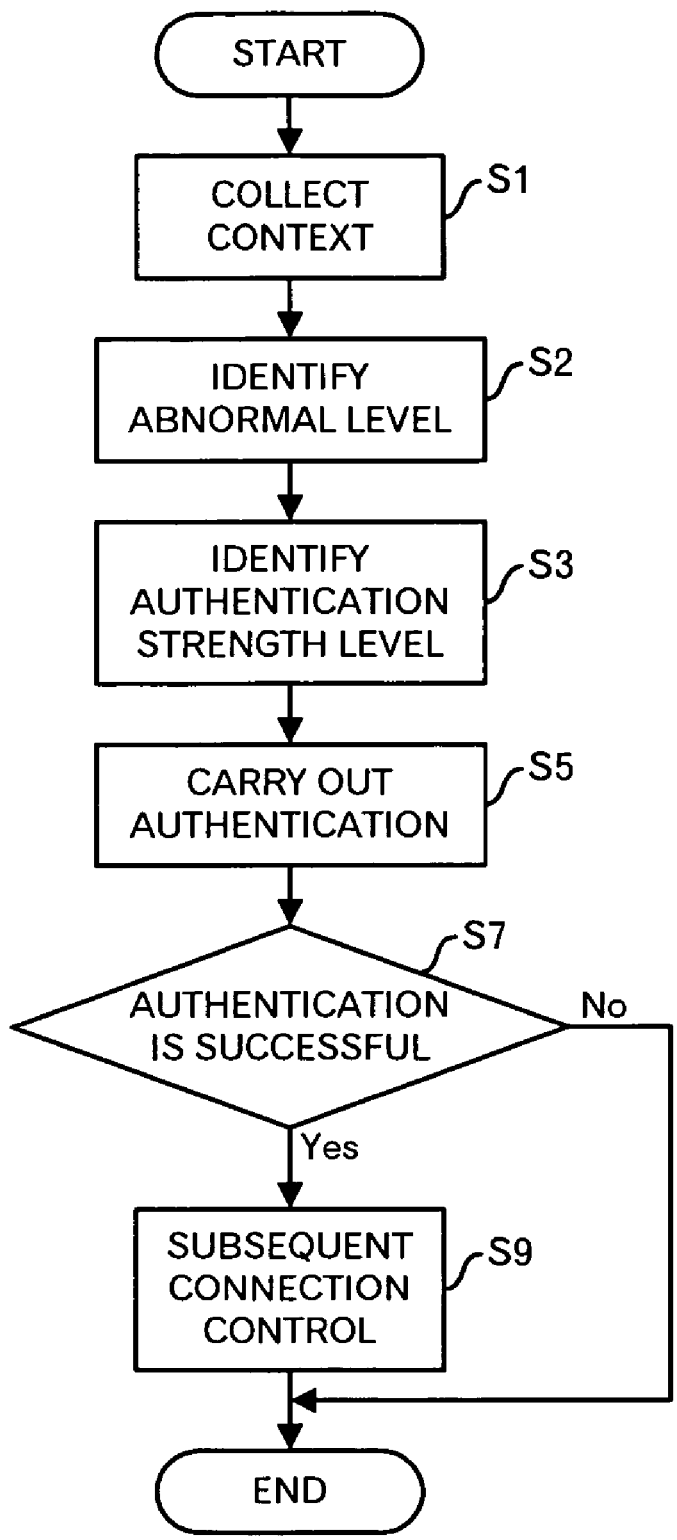
FIG. 2 is a diagram showing a first processing overview according to the embodiment of the present invention.

Next, a processing content of the system shown in FIG. 1 will be described with reference to FIG. 2 to FIG. 20. FIG. 2 shows an overview of a processing accompanying an authentication processing. First, the context collector 401 collects data of predefined contexts, and notifies the context management server 301 of the context data (Step S1). The context management server 301 receives the context data from the context collector 401, and stores the received data into the context storage. In the context storage, data is managed in a data format as shown in FIGS. 3A and 3B, for example. FIG. 3A shows an example of a data format to store public contexts. In an example of FIG. 3A, as the public contexts, a context on networks (NW), a context on traffics, a context on a society, a context on an earthquake, and a context on weather are held. In addition, FIG. 3B shows an example of a data format to store personal contexts. In an example of FIG. 3B, a context on a crime and a context on a health are held, in association with a user ID of each registered user. The context storage may be provided in the authentication/access policy management server 201 as described below. Specifically, the context data may be notified from the context management server 301 to the authentication/access policy management server 201.

Next, the context management server 301 identifies an abnormal level on the basis of the context data stored in the context storage and a reference table, and stores the abnormal level into an abnormal level data storage (Step S2). For example, a reference table as shown in FIG. 4 is used. In an example of FIG. 4, detailed conditions of an abnormal level III, an abnormal level II and an abnormal level I are prescribed for each public contexts (NW, traffic, society, earthquake, and weather) and each personal contexts (crime and health). When context data shown in FIG. 3A and FIG. 3B matches any definition shown in FIG. 4, an abnormal level corresponding to the matched definition is identified. Incidentally, the reference table may not be uniform for all users, and may be defined for each registered user.

In addition, FIGS. 5A and 5B show an example of data stored in the abnormal level data storage. FIG. 5A shows an example of a data format for abnormal levels identified on the basis of the public contexts. In an example of FIG. 5A, an abnormal level is stored for each of the network (NW), traffic, society, earthquake, and weather. In an example of FIG. 3A, the congestion occurred in the network, so that the abnormal level for the network is identified as the abnormal level I. In addition, with respect to the weather, because the context is identified as a heavy rain, the abnormal level for the weather is identified as the abnormal level II. In addition, FIG. 5B shows an example of a data format for abnormal levels identified on the basis of the personal contexts. In an example of FIG. 5B, an abnormal level for the crime and an abnormal level for the health are held in association with a user ID of each registered user. In an example of FIG. 3B, because the context for the health of a user A0001 is a fit of the chronic disease, the abnormal level for the health is determined as the abnormal level II. In addition, because the context for the crime of a user A0004 is an invasion, the abnormal level for the disease is determined as the abnormal level III.

Incidentally, the reference table and the abnormal level data storage may be provided in the context management server 301, or alternatively, provided in the authentication/access policy management server 201.

Next, in response to a connection request from the user terminal 101 and the like, the authentication/access policy management server 201 converts the abnormal level stored in the abnormal level data storage into an authentication strength level according to a predetermined rule, and identifies the authentication strength level (Step S3). This processing will be described below in more detail. Incidentally, the authentication types in the present embodiment include a user authentication, a device authentication, and an environment authentication. The authentication levels in each authentication type are defined as shown in FIG. 6, for example. In an example of FIG. 6, contents of the authentication levels from level 0 to level 4 are described for each of the user authentication, the device authentication, and the environment authentication. As for the user authentication, the definition is as follows: an ID/password authentication is carries out in level 1 that is the lowest authentication level, one type of biometric authentications is carried out in level 2, two or more types of authentications in the level 1 and the level 2 are carried out in level 3, and the authentications for predetermined plural persons (other users (superiors or the like)) are carried out in level 4, which is the highest level. In addition, as for the device authentication, the definition is as follows: a manufacturer is confirmed in level 1, which is the lowest authentication level, a manufacturing date is confirmed in addition to the manufacturer in level 2, an article number (serial number) is confirmed in addition to the manufacturer and the manufacturing date in level 3, and an authorization of a public authority is confirmed in level 4, which is the highest authentication level. Furthermore, as for the environment authentication, the definition is as follows: a version of OS is confirmed in level 1 that is the lowest authentication level, a virus detection capability is confirmed in addition to the version of the OS in level 2, a spyware detection capability is confirmed in addition to the version of the OS and the virus detection capability in level 3, and a CPU performance/disk capacity is confirmed in level 4 that is the highest authentication level.

Incidentally, with reference to FIG. 6, the highest level, a high level, a normal level and the lowest level can be defined for the authentication strength level, and for example, it is assumed that a case where one of the user authentication, the device authentication and the environment authentication is carried out is a normal level (including 3 ways), that a case where any two of the user authentication, the device authentication and the environment authentication are carried out is a high level (including 3 ways), that a case where all of them are carried out is the highest level, and that a case where none of them is carried out is the lowest level. With this arrangement, 8 ways can be defined. Furthermore, when levels of the user authentication, levels of the device authentication and levels of the environment authentication are combined for each authentication strength level, it is possible to break down the highest level into 64 levels ($4^3$), the high level into 16 levels ($=4\times 4$) and 48 patterns ($=16\times 3$), respectively, and the normal level into 4 levels and 12 patterns ($=4\times 3$), respectively. By breaking down levels, it is possible to use 84 ($=64+16+4$) levels and 124 ($=64+48+12$) patterns in total. Incidentally, any authentication strength level may be employed.

Then, the authentication/access policy management server 201 identifies an authentication server(s) required in association with the authentication strength level, and causes the identified authentication server(s) to carry out the necessary authentication processing (Step S5). The result of the authentication processing is notified from each of the authentication servers to the authentication/access policy management server 201. The authentication/access policy management server 201 receives the authentication result from each of the authentication servers, and determines whether or not the authentication is successful synthetically (Step S7). When the authentication is not successful, the processing is terminated. On the other hand, when the authentication is successful, subsequent connection control such as routing and connection setup is done. Then, access permission are notified and set to the apparatuses belonging to the user plane 100 (Step S9). The NW equipments belonging to the user plane 100 carry out a processing for the connection request from the user terminal 101 or the like according to the notification and setting. After that, the processing ends.

By carrying out this processing, the abnormal level is identified according to the context relating to abnormalities, and the abnormal level is converted into the authentication strength level according to a predetermined rule. Then, when the authentication is carried out according to the authentication strength level, the authentication according to the context relating to the abnormalities is carried out.

Incidentally, although FIG. 2 shows a case where the authentication is carried out, an access control may be carried out without carrying out the authentication. In such a case, first, the context collector 401 collects the predefined contexts, and notifies the context management server 301 of the context data (FIG. 7, Step S11). The context management server 301 receives the context data from the context collector 401 and stores the context data into the context storage. This processing is identical with the step S1.

Next, the context management server 301 identifies an abnormal level on the basis of data stored in the context storage and the reference table, and stores the identified abnormal level into an abnormal level data storage (Step S13). This step is identical with the step S2.

Then, in response to the connection request from the user terminal 101 and the like, the authentication/access policy management server 201 converts the abnormal level stored in the abnormal level data storage into a connection priority according to a predetermined rule to identify the connection priority (Step S15). The connection priority includes a compulsive accept of connection, a compulsive rejection of connection, a preferential connection, and a connection with a lowered priority. This step will be described below in detail.

After that, the authentication/access policy management server 201 sets the identified connection priority to NW equipments belonging to the user plane 100, and causes the NW equipments to carry out a subsequent connection control such as routing and connection setup according to the connection priority (Step S17). Incidentally, when the connection is compulsively rejected, routing is not carried out at all and the connection request is discarded. Then, the processing ends.

By carrying out such a processing, the abnormal level is identified according to the context relating to the abnormalities, and the abnormal level is converted into the connection priority according to a predetermined rule. Then, when routing and connection setup are carried out according to the connection priority, the access control/connection control is carried out according to the context relating to the abnormalities.

Figure 8:
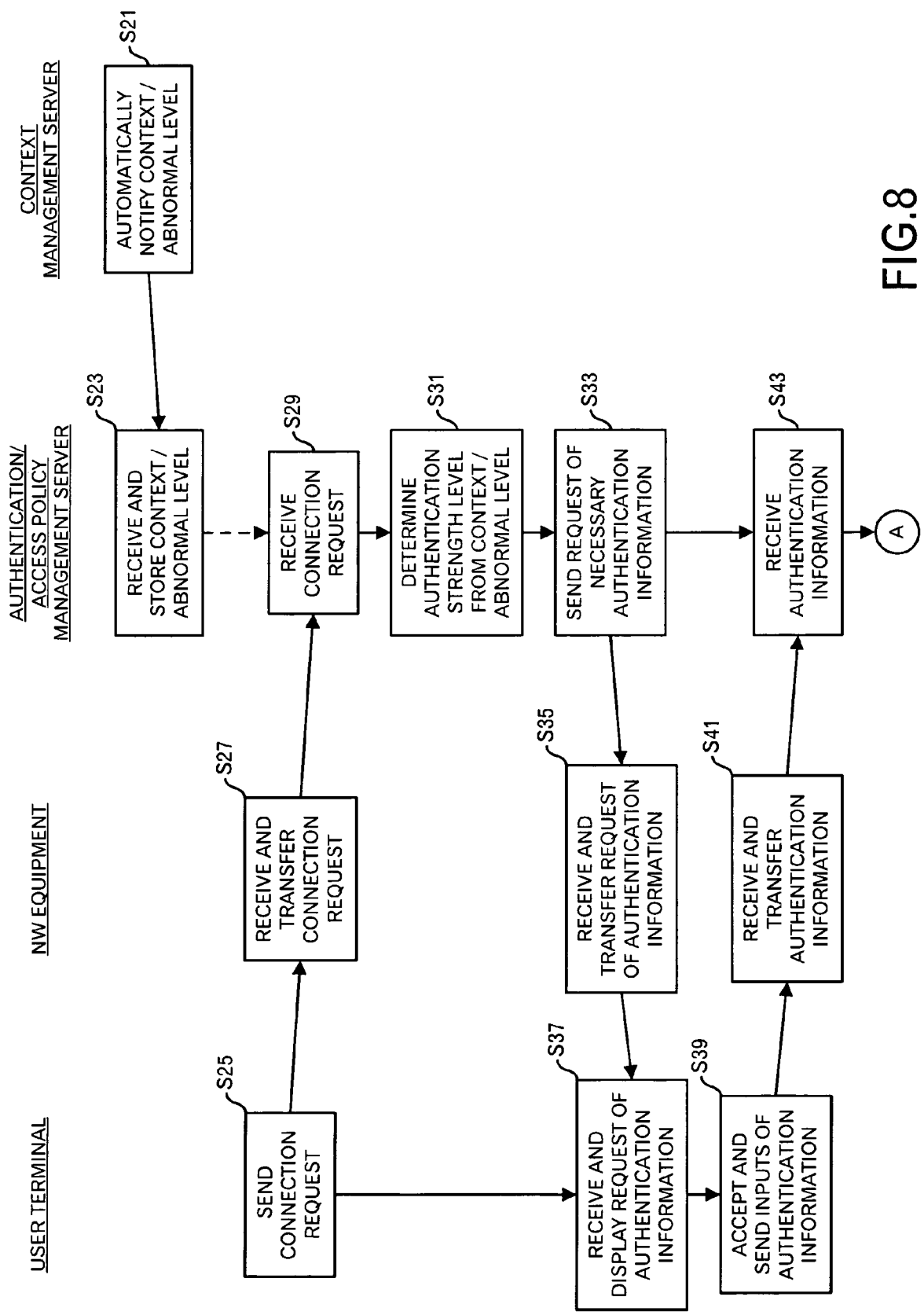
FIG. 8 is a diagram showing an example of a default processing flow according to the embodiment of the present invention.

Next, a basic processing flow will be described in detail with reference to FIG. 8 to FIG. 20. The context management server 301 automatically transmits data of a changed context in the context data stored in the context storage or data of a changed abnormal level in the abnormal level data stored in the abnormal level data storage to the authentication/access policy management server 201 (FIG. 8, Step S21). Incidentally, data for all of the contexts or data for all of the abnormal level may be periodically transmitted to the authentication/access policy management server 201. The authentication/access policy management server 201 receives data of the context or data of the abnormal level from the context management server 301, and stores the received data into the context storage or the abnormal level data storage in the authentication/access policy management server 201 (Step S23).

The user terminal 101 transmits a connection request (or the authentication request) including a source user ID and a called party address and the like to the NW equipment 103 (Step S25). When the NW equipment 103 receives the connection request from the user terminal 101, the NW equipment 103 transfers the connection request to the authentication/access policy management server 201 (Step S27).

After that, the authentication/access policy management server 201 receives the connection request from the NW equipment 103 (Step S29), and determines an authentication strength level from a service content relating to the connection request, the abnormal level identified from data of the context or the abnormal level itself already identified, and a predetermined rule (Step S31). As described above, this processing will be described below in detail. However, because there is a case where the authentication is not required, the processing shifts to the step S67 of FIG. 10. When the authentication strength level is identified, the authentication/access policy management server 201 identifies an authentication processing corresponding to the authentication strength level, and transmits a request of authentication information (such as ID and password, fingerprints, and the like) required for the identified authentication processing to the user terminal 101 (Step S33). The NW equipment 103 receives the request of the authentication information from the authentication/access policy management server 201, and transfers the received request of the authentication information to the user terminal 101 (Step S35). The user terminal 101 receives the request of the authentication information from the NW equipment 103, and displays contents of the request on a display device (Step S37).

The user confirms required authentication information displayed on the display device, and inputs it to the user terminal 101. The user terminal 101 accepts inputs of the authentication information from the user, and transmits the input data to the authentication/access policy management server 201 (Step S39). For example, a special equipment or a semiconductor chip provided on the user terminal 101 may transmit the collected authentication information. The NW equipment 103 receives the authentication information from the user terminal 101, and transfers it to the authentication/access policy management server 201 (Step S41). The authentication/access policy management server 201 receives the authentication information from the user terminal 101 through the NW equipment 103 (Step S43). After that, the processing shifts to a processing of FIG. 9 through a terminal A.

Figure 9:
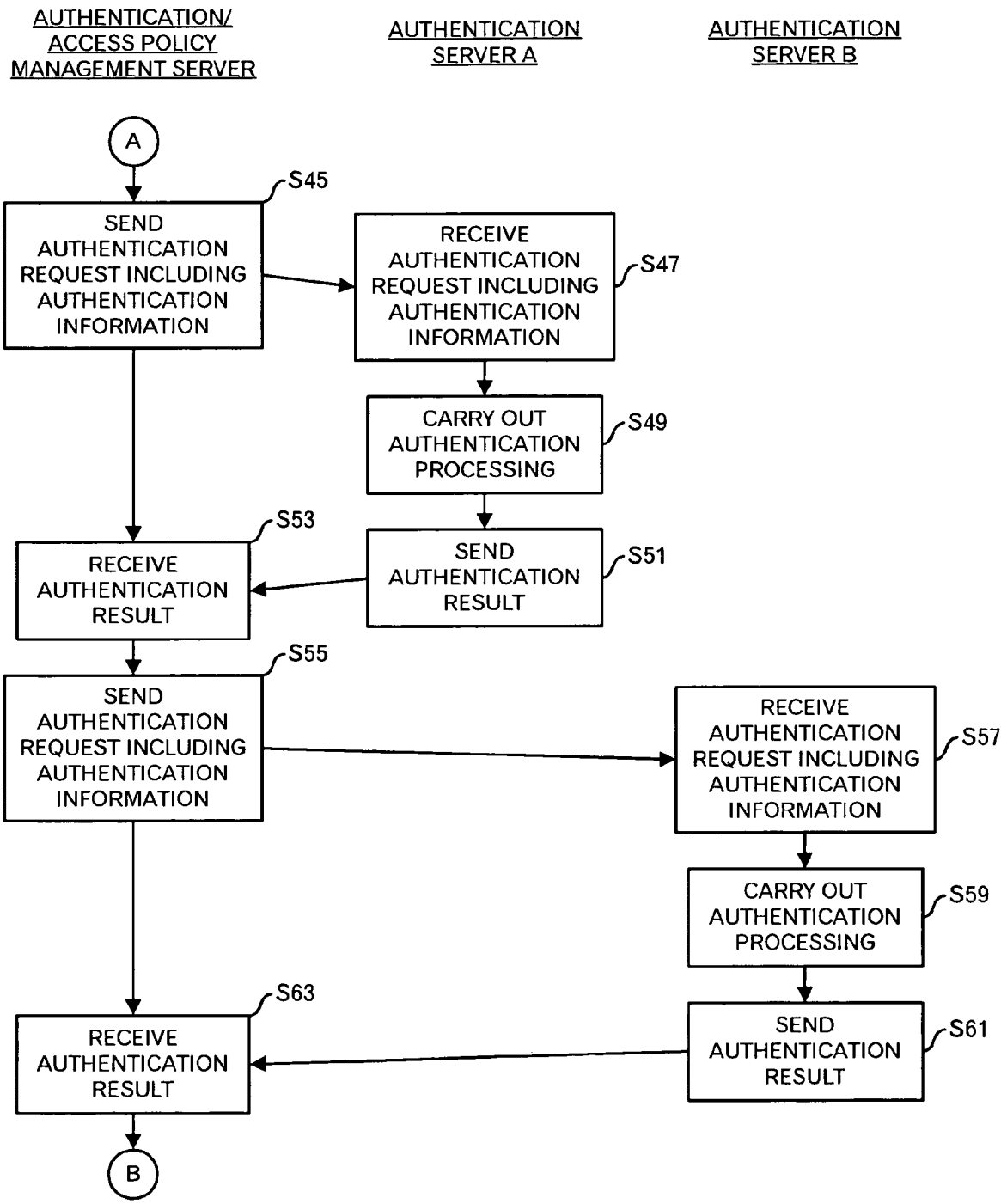
FIG. 9 is a diagram showing an example of the default processing flow according to the embodiment of the present invention.
Figure 10:
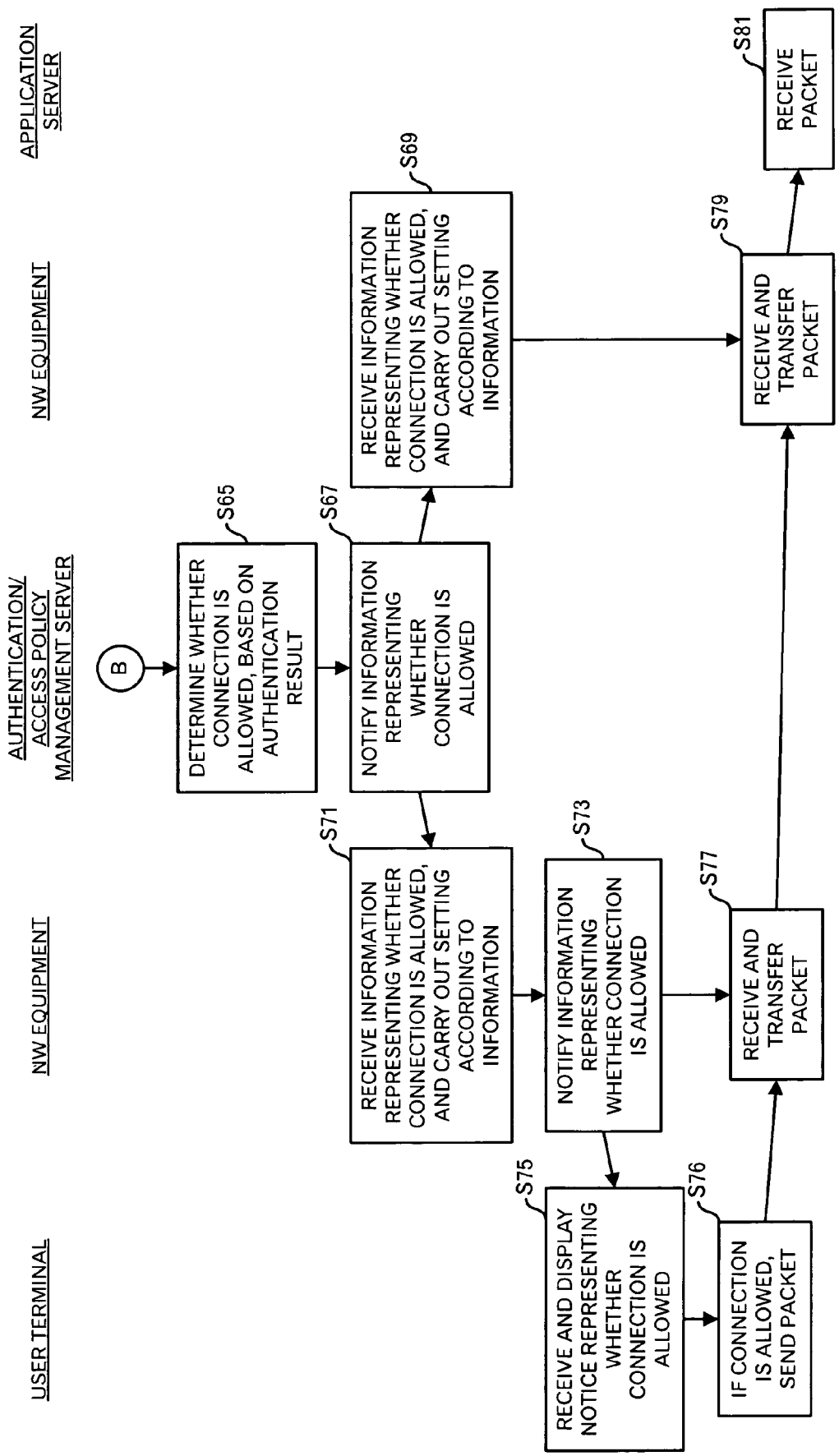
FIG. 10 is a diagram showing an example of the default processing flow according to an embodiment of the present invention.

Shifting to the explanation of FIG. 9, the authentication/access policy management server 201 transmits an authentication request including authentication information used for the authentication server A out of the authentication information from the user terminal 101 to the authentication server A (Step S45). The authentication server A receives the authentication request including the authentication information used for the authentication server A from the authentication/access policy management server 201 (Step S47). Then, the authentication server A carries out an authentication processing using the authentication information used for the authentication server A (Step S49). Because a detailed content of the authentication processing is not the substance of this embodiment, the description thereof will be omitted. The authentication server A transmits the authentication result to the authentication/access policy management server 201 (Step S51). The authentication/access policy management server 201 receives the authentication result from the authentication server A, and stores it to a data storage (Step S53).

In addition, the authentication/access policy management server 201 transmits the authentication request including authentication information used for the authentication server B out of the authentication information received from the user terminal 101 to the authentication server B (Step S55). The authentication server B receives the authentication request including the authentication information used for the authentication server B from the authentication/access policy management server 201 (Step S57). Then, the authentication server B carries out an authentication processing using the authentication information used for the authentication server B (Step S59). The authentication server B transmits the authentication result to the authentication/access policy management server 201 (Step S61). The authentication/access policy management server 201 receives the authentication result from the authentication server B, and stores it to the data storage (Step S63). Then, the processing sifts to a processing shown in FIG. 10 through a terminal B.

Such a processing is carried out for each authentication server that carries out the authentication processing identified by the authentication strength level. In addition, although FIG. 9 indicates an example that the processing is carried out in serial, the authentication request may be transmitted in parallel to plural authentication servers.

The authentication/access policy management server 201 determines whether or not the connection is allowed, on the basis of the received authentication result (Step S65). Specifically, it is determined whether or not all of the authentication results indicate success of the authentication. When all of the authentication results indicate the success of the authentication, it is determined that the connection is allowed. However, when any one of the authentication results indicates failure of the authentication, it is determined that the connection is rejected. Then, the authentication/access policy management server 201 transmits an instruction representing whether or not the connection is allowed to the NW equipment 103, and also transmits the instruction to other related equipments (Step S67).

The NW equipment 103 receives the instruction representing whether or not the connection is allowed from the authentication/access policy management server 201, and carries out a setting according to the instruction (Step S71). In the same manner, other related NW equipments receive the instruction representing whether or not the connection is allowed, and carries out a setting according to the instruction (Step S69). When it is an instruction that the connection is allowed, a setting is carried out to enable the connection between the user terminal 101 and the called party relating to the connection request. On the other hand, when it is an instruction that the connection is not allowed, a setting is carried out to block the connection between the user terminal 101 and the called party relating to the connection request.

In addition, the NW equipment 103 notifies the user terminal 101 of information representing whether or not the connection is allowed (Step S73). The user terminal 101 receives a notice representing whether or not the connection is allowed, from the NW connection device 103, and displays the notice on the display device (Step S75). In addition, when the connection is allowed, the user terminal 101 transmits an access packet corresponding to the connection request to, for example, an application server 108 (Step S76). The NW equipment 103 receives the access packet from the user terminal 101, and transfers the access packet after confirming that it is a packet relating to the setting for the allowed connection (Step S77). In the same manner, other equipments on the route to the application server 108 receive the access packet from the user terminal 101, and transfer the access packet after confirming that it is a packet relating to the setting for the allowed connection (Step S79). The application server 108 receives the access packet from the user terminal 101, and carries out a corresponding processing (Step S81). The subsequent processing is the same as the normal processing, so that the description thereof will be omitted.

By carrying out such a processing, the authentication strength level is identified according to the context relating to the abnormalities, and the authentication according to the identified level is carried out. As a result, it is determined whether or not the connection is allowed, and when the connection is allowed, the communication is carried out.

Figure 11:
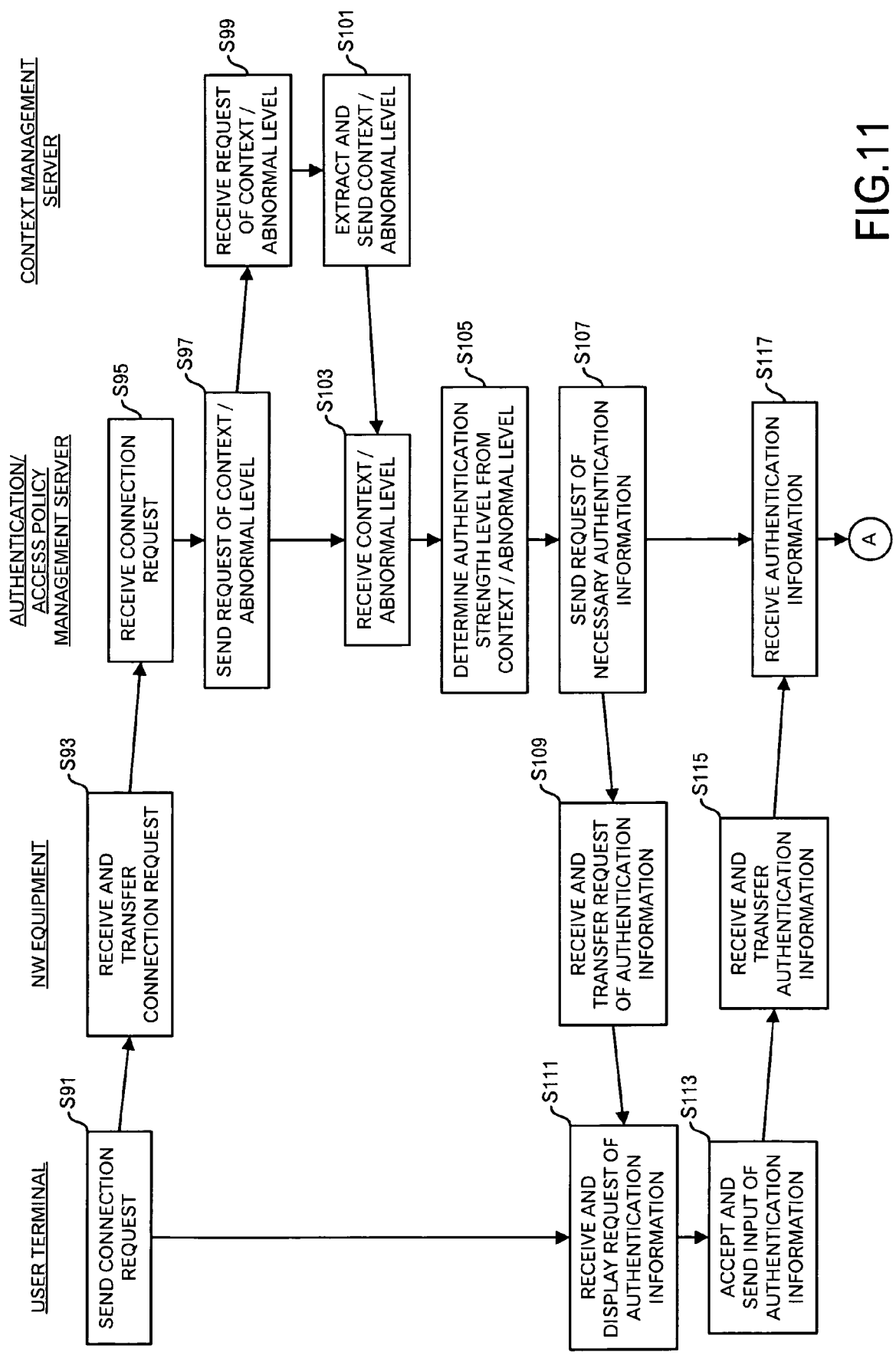
FIG. 11 is a diagram partially showing another example of the default processing flow according to the embodiment of the present invention.

Although the processing flow shown in FIG. 8 indicates an example that the context management server 301 automatically transmits the context data or the abnormal level to the authentication/access policy management server 201, a processing may be performed as shown in FIG. 11 instead of the processing shown in FIG. 8.

In other words, the user terminal 101 transmits a connection request (or an authentication request) including a source user ID, a called party address and the like, to the NW equipment 103 (Step S91). The NW equipment 103 receives the connection request from the user terminal 101, and transfers the connection request to the authentication/access policy management server 201 (Step S93). The authentication/access policy management server 201 receives the connection request from the NW equipment 103 (Step S95), and transmits a context/abnormal level request including the user ID included in the connection request to the context management server 301 (Step S97). The context management server 301 receives the context/abnormal level request from the authentication/access policy management server 201 (Step S99), extracts context data relating to the user ID included in the context/abnormal level request from the context storage, or extracts abnormal level identified from the extracted context data, from the abnormal level data storage, and transmits the context data or the abnormal level to the authentication/access policy management server 201 (Step S101). Incidentally, as for the context data or the abnormal level, the context data or the abnormal level corresponding to the user ID is extracted with respect to the context depending on each registered user, and the common context data or the abnormal level for the common context is further extracted. Then, the authentication/access policy management server 201 receives the context data or the abnormal level data from the context management server 301 (Step S103).

After that, the authentication/access policy management server 201 determines an authentication strength level from the service content relating to the connection request received at the step S95, the abnormal level identified from the context data or the abnormal level itself already identified, and a predetermined rule (Step S105). As described above, this processing will be described below in detail. However, because it is judged that the authentication is not required, in this case, the processing shifts to the step S67 of FIG. 10. When the authentication strength level is identified, the authentication/access policy management server 201 identifies the authentication processing corresponding to the authentication strength level, and transmits a request of authentication information (for example, ID and password, data of fingerprints and the like) required in the identified authentication processing to the user terminal 101 (Step S107). The NW equipment 103 receives an authentication information request from the authentication/access policy management server 201, and transfers it to the user terminal 101 (Step S109). The user terminal 101 receives the authentication information request from the NW equipment 103, and displays the requested content on the display device (Step S111).

The user confirms required authentication information displayed on the display device, and inputs the required authentication information to the user terminal 101. The user terminal 101 accepts inputs of the authentication information from the user, and transmits the input data to the authentication/access policy management server 201 (Step S113). The NW equipment 103 receives the authentication information from the user terminal 101, and transfers the authentication information to the authentication/access policy management server 201 (Step S115). The authentication/access policy management server 201 receives the authentication information from the user terminal 101 through the NW equipment 103 (Step S117). After that, the processing shifts to a processing of FIG. 9 through the terminal A. The subsequent processings are the same.

Thus, even in a case where the context data or data of the abnormal level are transmitted in response to a request from the authentication/access policy management server 201, the same effect can be obtained.

In addition, as described above, the processing to identify the abnormal level may be carried out in the context management server 301, or alternatively, carried out in the authentication/access policy management server 201.

Figure 12:
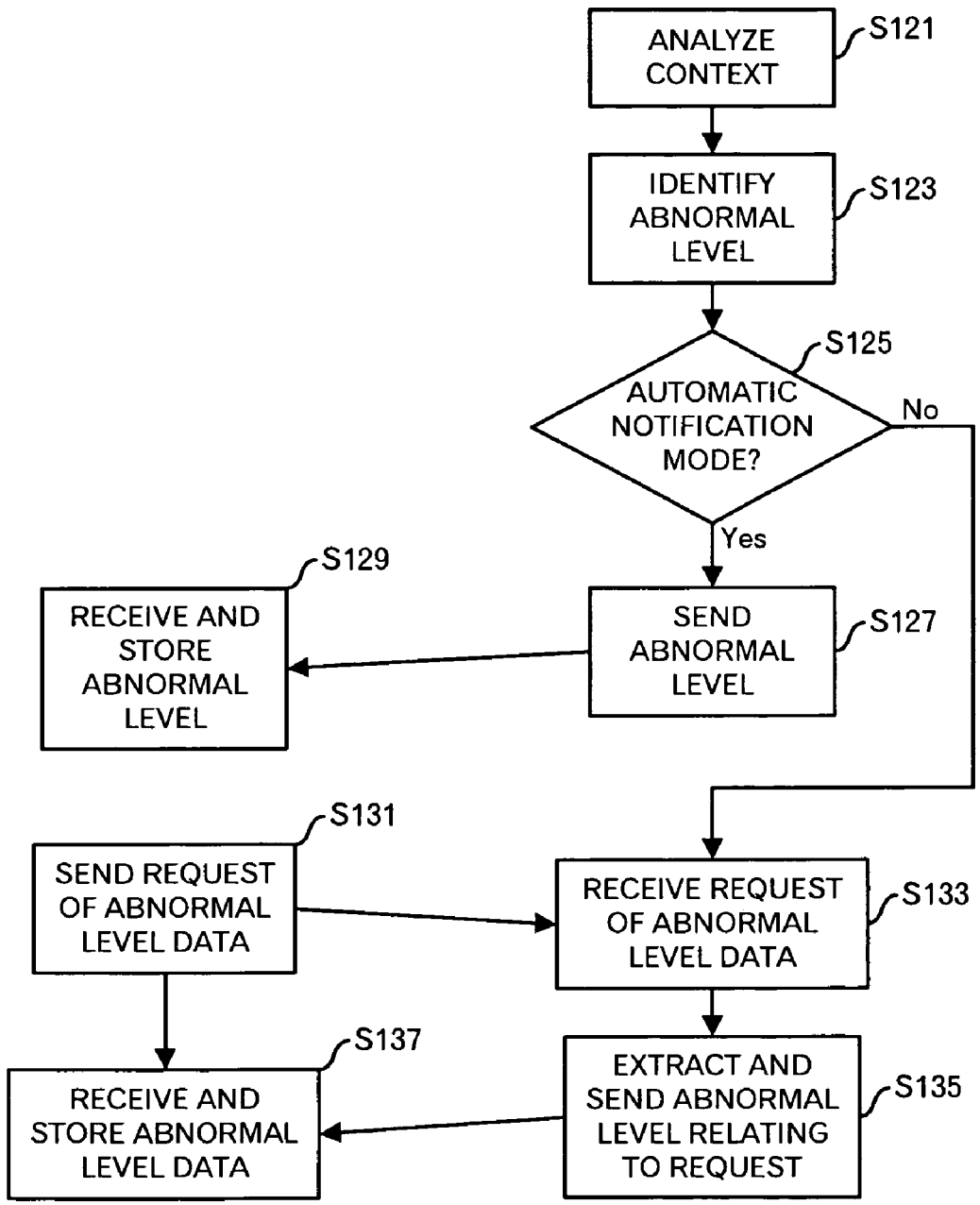
FIG. 12 is a diagram showing an example of an identification processing of an abnormal level.

The content of the processing to identify the abnormal level, which is carried out by the context management server 301, will be described with reference to FIG. 12. In this case, the context management server 301 analyzes the context DATA stored in the context storage on the basis of a reference table (Step S121), and identifies the abnormal level for each of the public context and the personal context (Step S123). The steps S121 and S123 are carried out periodically or when the context is changed or updated. When an automatic notification mode is set to ON (Step S125: Yes route), the context management server 301 automatically transmits data of the abnormal level identified in the step S123 to the authentication/access policy management server 201 (Step S127). The authentication/access policy management server 201 receives the data of the abnormal level from the context management server 301, and stores it into the abnormal level data storage of the authentication/access policy management server 201 (Step S129). Incidentally, the transmitted abnormal level data may be limited only to updated data.

On the other hand, when the automatic notification mode is set to OFF (Step S125: No route), the context management server 301 repeats the steps S121 and S123 until the request is received. When the authentication/access policy management server 201 receives the connection request or the like from the user terminal 101, it transmits an abnormal level data request including the user ID relating to the connection request or the like to the context management server 301 (Step S131). When the context management server 301 receives the abnormal level data request including the user ID from the authentication/access policy management server 201 (Step S133), the context management server 301 extracts data of the abnormal level relating to the request (the abnormal level identified from the personal context corresponding to the user ID and the abnormal level identified from the public context), and transmits the extracted data to the authentication/access policy management server 201 (Step S135). The authentication/access policy management server 201 receives the data of the abnormal level from the context management server 301, and stores the received data into the abnormal level data storage of the authentication/access policy management server 201 (Step S137). Then, a processing to identify the authentication strength level and the like are carried out.

For example, the abnormal level relating to the public context may be transmitted from the context management server 301 to the authentication/access policy management server 201 in the automatic notification mode, and the abnormal level relating to the personal context may be transmitted from the context management server 301 to the authentication/access policy management server 201 in response to the request. The abnormal level data request may have designation of requesting data of the abnormal level relating to the public context or designation of requesting data of the abnormal level relating to the personal context.

Figure 13:
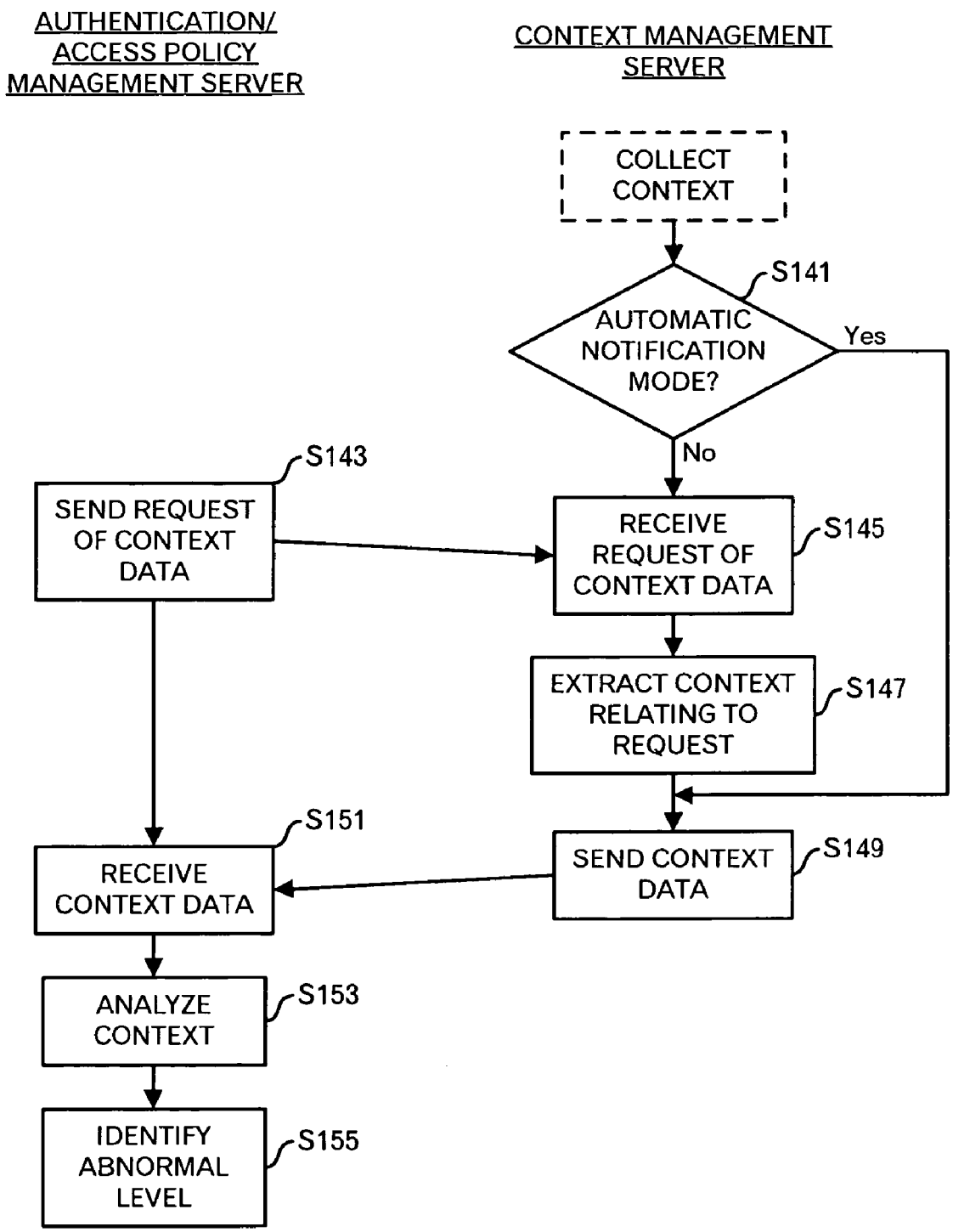
FIG. 13 is a diagram showing another example of the identification processing of the abnormal level.
Figure 14:
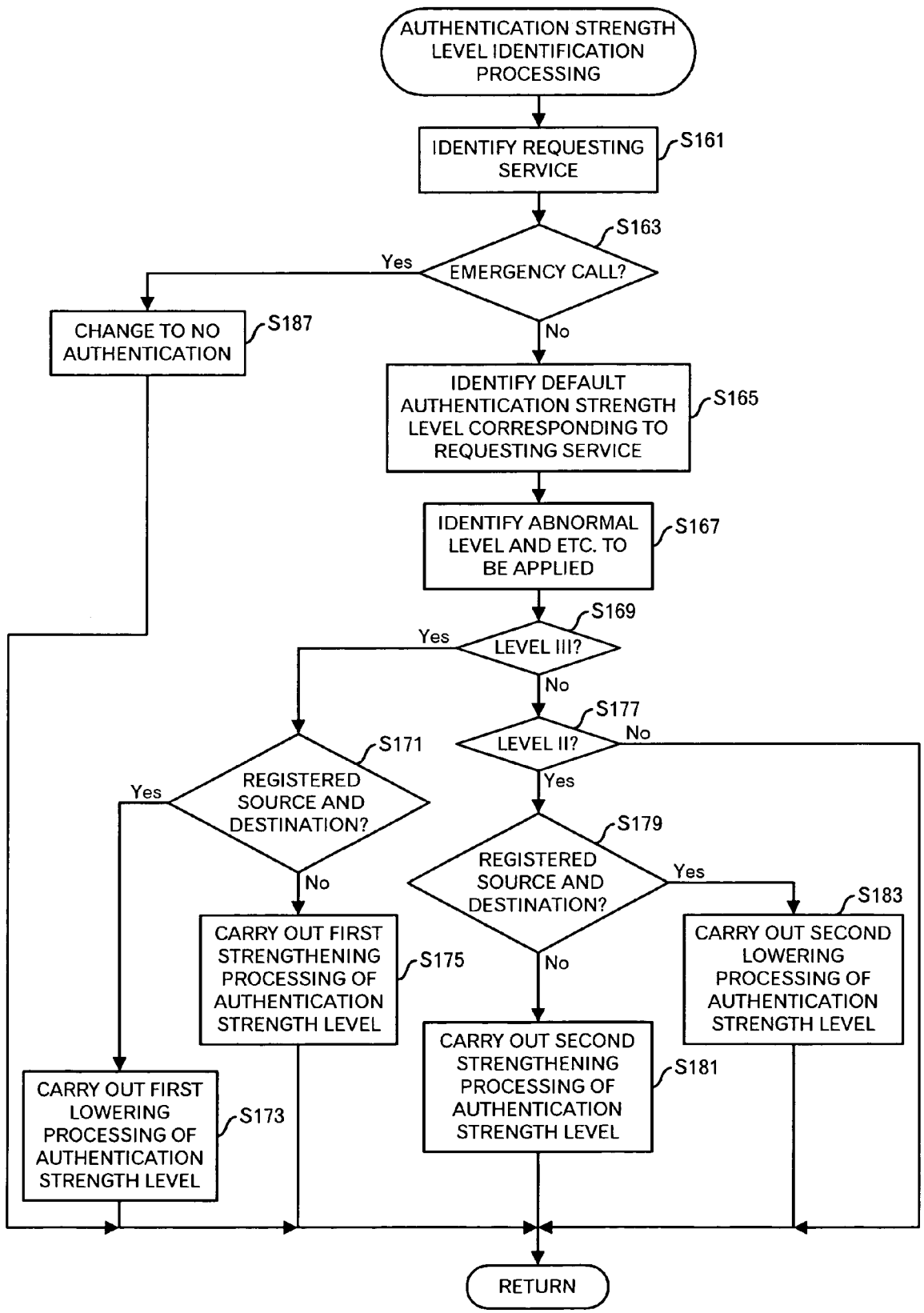
FIG. 14 is a diagram showing a processing flow of an authentication strength level identification processing.

Next, the content of the processing to identify the abnormal level, which is carried out by the authentication/access policy management server 201 instead of the context management server 301, will be described with reference to FIG. 13. In this case, in the context management server 301, the context is collected as a preprocessing, and data of the context is stored into the context storage. When the automatic notification mode is set to ON (Step S141: YES route), the context management server 301 reads out data of the context from the context storage, and transmits it to the authentication/access policy management server 201, periodically or when the context is changed (Step S149). The context data to be transmitted may be only the changed context, and may be all context data, for example, periodically. The authentication/access policy management server 201 receives the context data from the context management server 301 (Step S151), and stores it into the context storage of the authentication/access policy management server 201.

The authentication/access policy management server 201 analyzes the context data stored in the context storage on the basis of the reference table (Step S153), and identifies the abnormal level for each of the public context and the personal context (Step S155). Then, a processing for identifying the authentication strength level and the like are carried out.

On the other hand, when the automatic notification mode is set to OFF (Step S141: No route), the context management server 301 stores the collected context data into the context storage until the context data request is received from the authentication/access policy management server 201. Then, when the authentication/access policy management server 201 receives the connection request or the like from the user terminal 101, it transmits a context data request including the user ID relating to the connection request to the context management server 301 (Step S143). The context management server 301 receives the context data request from the authentication/access policy management server 201 (Step S145), and extracts the contexts relating to the request from the context storage of the context management server 301 (Step S147). The personal context corresponding to the user ID included in the context data request is extracted, and the public context is further extracted. Then, the processing shifts to the step S149, and the extracted context data is transmitted to the authentication/access policy management server 201.

For example, the public context may be transmitted from the context management server 301 to the authentication/access policy management server 201 in the automatic notification mode, and the personal context may be transmitted from the context management server 301 to the authentication/access policy management server 201 in response to the request. The context data request may have designation of requesting the public context or designation of requesting the personal context.

Next, a processing to identify the authentication strength level will be described with reference to FIGS. 14 to 18. This processing is carried out by the authentication/access policy management server 201. First, it identifies a requesting service by using a called party address of the received connection request or the like (Step S161). A correspondence table between the called party address (including URL (uniform resource locator)) and the service content are prepared in advance, and the requesting service may be identified using the correspondence table. It is also possible to set the URL to partially include a code of the requesting service. In addition, the authentication/access policy management server 201 may ask which service is to be carried out for the called party relating to the connection request.

Then, it determines whether or not the requesting service is an emergency call (Step S163). For example, it checks whether or not the connection request (such as a call request) is addressed to a predetermined emergency call destination such as a police station or a fire station. When the connection request is an emergency call, it changes the authentication strength level to none, which means the authentication is not carried out (Step S187). When any authentication is required in a case where the connection request is not any emergency call, it is said that the authentication strength level is lowered. Next, the processing returns to the original calling processing.

On the other hand, when the request service is not any emergency call, the authentication/access policy management server 201 identifies a default authentication strength level corresponding to the requesting service (Step S165). For the step S165, the authentication/access policy management server 201 holds the default authentication strength level table as shown in FIG. 15. In an example of FIG. 15, a class of the requesting service, requesting services belonging to the class, and the corresponding default authentication strength level are registered. For example, for services in a medical field, in case of an access to an electronic carte (including personal history), following settings for the default authentication strength level are carried out: level 2 (L2, where L represents level) is set with respect to the user authentication, and level 3 is set with respect to the device authentication.

Then, it identifies the abnormal level to be applied and the context type in that case on the basis of data stored in the abnormal level data storage (Step S167). When only one abnormal level is to be applied, that abnormal level is applied, and when plural abnormal levels are to be applied, the highest abnormal level among them is applied, for example.

Next, it determined whether or not the abnormal level to be applied is level III (that is, an emergency level) (Step S169). When the abnormal level to be applied is the level III, it determines whether or not a combination of a source user ID or an address relating to the connection request, and a called party user ID or address relating to the connection request has been registered in the sending and receiving registration table in the authentication/access policy management server 201 (Step S171). In an example of FIG. 16, the source user ID (or address) and the called party user ID (or address) are correspondingly stored. For each registered user, a list of the called party user IDs or addresses may be prepared.

When the combination has already been registered, the authentication/access policy management server 201 carries out a first lowering processing of the authentication strength level (Step S173). This is because the connection is supposed in advance when the combination has already been registered and the connection as quick as possible is preferable in case of the emergency.

An example of the first lowering processing of the authentication strength level will be described with reference to FIG. 17. FIG. 17 shows an example of an authentication strength level-changing table. In an example of FIG. 17, for each of the public context (NW, traffic, society, earthquake, and weather) and personal context (crime, health), and for each abnormal level, a method of changing the authentication strength level is defined. Incidentally, not only the abnormal level but also whether or not the sending and receiving registration table has been registered change a method of changing the authentication strength level. In addition, as a specific method of changing, there is a method of increasing or decreasing the number of authentication types to be applied, for example, a method of changing the authentication strength level as carrying out only the user authentication when the user authentication and the device authentication are required, and a method of increasing or decreasing level for the respective authentication methods. Incidentally, in an example of FIG. 17, when the abnormal level on the basis of the personal context is employed, a substantial authentication is not performed. This is on the basis of an idea that a quick communication is preferred for the personal abnormal state. However, such a setting is not necessarily employed. In addition, while the change method is presented in a table format, this is to easily compare the change method, and the table format is not necessarily employed.

Therefore, when a combination of the source user ID or address and the destination user ID or address, which are related to the connection request has already been registered in the sending and receiving registration table, and the abnormal level to be applied and the context type thereof are represented as the abnormal level III of the weather context, the number of authentication types to be applied is reduced by 1.

For example, when the requesting service relating to the connection request is a transaction requiring a large amount of money, that is, more than 1000 dollars in the financial field, the default authentication strength level is defined as level 3 for the user authentication and level 3 for the device authentication. When the abnormal level to be applied and the context type thereof are represented as level III of the weather context as described above, the number of authentication types to be applied is reduced by 1, and the user authentication is remained as a result. Specifically, a rule is applied that the authentication type is reduced in a sequence of the environment authentication, the device authentication, and the user authentication.

In addition, a second example of the first lowering processing of the authentication strength level will be described with reference to FIG. 18. FIG. 18 shows an example of the authentication strength level setting table. In an example of FIG. 18, for each public context (NW, traffic, society, earthquake, and weather) and personal context (crime and health), and for each abnormal level (other than a level I), the authentication strength level to be employed is defined. Thus, according to the second example of the first lowering processing of the authentication strength level, the predetermined authentication strength level is set. In this case, except for level I, it is not necessary to identify the default authentication strength level. Incidentally, in an example of FIG. 18 as well, a lower authentication strength level is set for the combination of the source user ID and the called party source ID, which has already been registered, rather than the combination, which has not been registered. Specifically, when the abnormal level III of the NW context is identified and the combination of the source user ID and the destination user ID has already been registered, only level 1 of the user authentication is required. However, when the combination described above has not been registered, level 3 of the user authentication, level 3 of the device authentication, and level 3 of the environment authentication are required. When a disaster occurs, if the combination of the source and destination has already been registered, a communication between those are supposed, and therefore it is necessary to enable the communication as soon as possible, such as the communication among family or within the same company. However, when the destination has not been registered, for example, because there is possibility that other person requests a connection in his or her own way, and does wrong under cover of a disaster, this embodiment prevents such an illegal action in advance by increasing the authentication strength level. Incidentally, in an example of FIG. 18, on the basis of an idea that communication should be carried out quickly, the authentication is set to be unnecessary for the personal abnormality, but this is not necessarily employed. Moreover, although the changing methods are presented in a table format, this is to easily compare the changing methods, and the table format is not necessarily employed.

On the other hand, when the combination has not been registered, the authentication/access policy management server 201 carries out a first strengthening processing of the authentication strength level (Step S175). According to the table shown in FIG. 17 or FIG. 18, it identifies an authentication strength level on the basis of the abnormal level to be applied, the context type thereof, and whether or not the source user ID and the destination user ID have been registered. In an example of FIG. 17, except for a case that the abnormal level for the personal context is employed, the increase of the authentication strength level is set. In an example of FIG. 18, except for the personal context, a relatively high authentication strength level is set. After that, the processing returns to the original calling processing.

Furthermore, when the abnormal level to be applied is not level III, the authentication/access policy management server 201 determines whether or not the abnormal level is level II (that is, the abnormal state level) (Step S177). When the abnormal level is level II, it determines whether or not the combination of the source user ID or address and the called party user ID or address, which are related to the connection request has been registered in the sending and receiving registration table of the authentication/access policy management server 201 (Step S179).

When the combination has been registered, the authentication/access policy management server 201 carries out a second lowering processing of the authentication strength level (Step S183). This is because the connection is supposed when the combination has already been registered and the communication as quick as possible is preferable in case of the emergency. Then, according to the table shown in FIG. 17 or FIG. 18, it identifies the authentication strength level on the basis of the abnormal level to be applied, the context type thereof, and the fact that the combination of the source user ID and the called party user ID has been registered. In an example of FIG. 17, except for a case that the abnormal level for the personal context is employed, the decrease of the authentication strength level is carried out. In an example of FIG. 18, except for a case that the abnormal level for the personal context is employed, a relatively low authentication strength level is set.

On the other hand, when the combination has not been registered, the authentication/access policy management server 201 carries out a second strengthening processing of the authentication strength level (Step S181). According to the table shown in FIG. 17 or FIG. 18, it identifies the authentication strength level on the basis of the abnormal level to be applied, the context type thereof, and the fact that the combination of the source user ID and the called party user ID has not been registered. In an example of FIG. 17, except for a case that the abnormal level for the personal context is employed, the increase of the authentication strength level is carried out. In an example of FIG. 18, except for a case that the abnormal level for the personal context is employed, a relatively high authentication strength level is set. After that, the processing returns to the original calling processing.

In addition, when it is determined that the abnormal level is not level II, it is level I. Therefore, the processing returns to the original calling processing without carrying out any processing in order to apply the default authentication strength level identified in the step S165. However, any adjustment to the default authentication strength level can be made.

Figure 19:
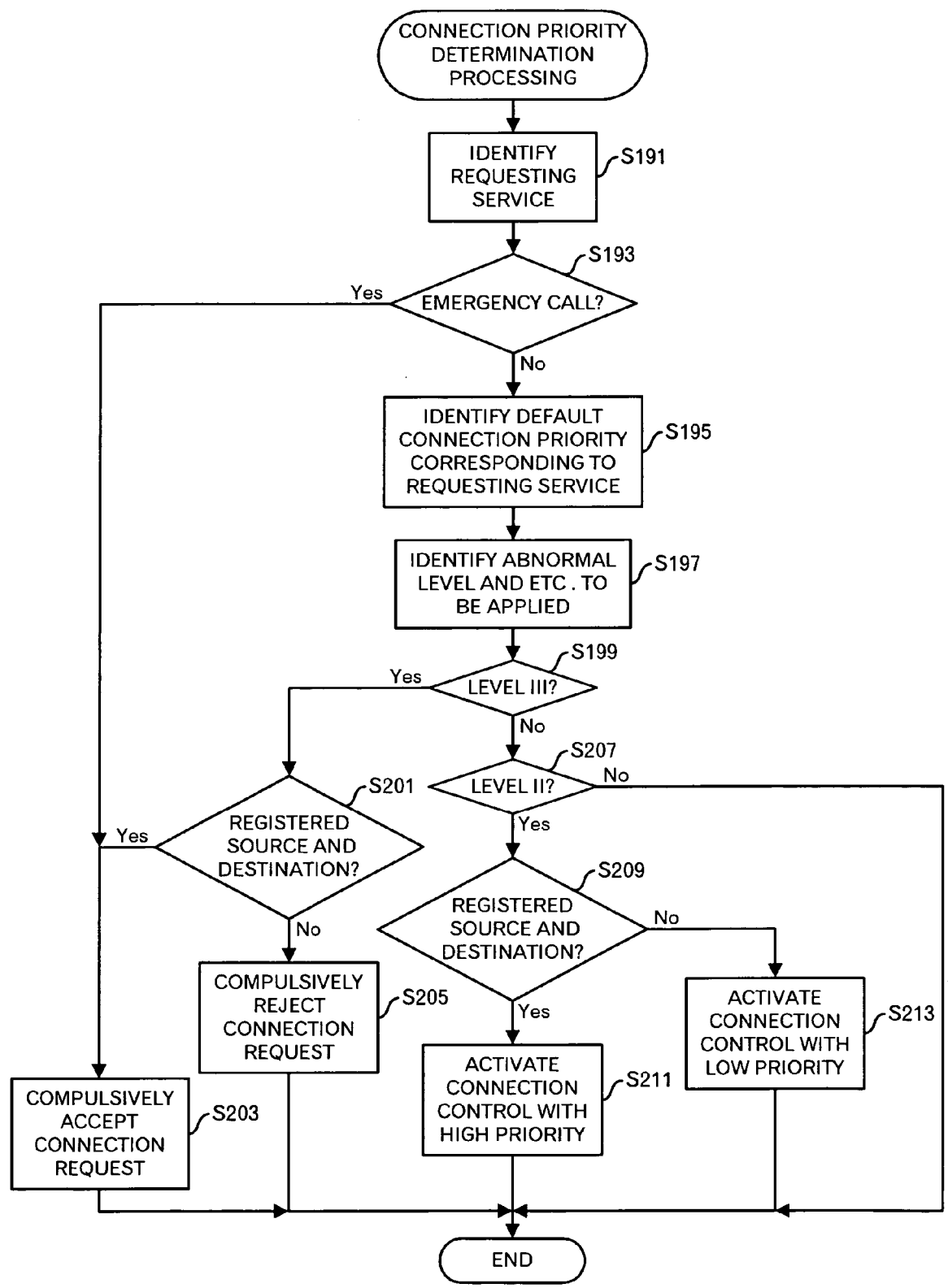
FIG. 19 is a diagram showing a processing flow of a connection priority determination processing.

Next, a processing when the authentication processing is not carried out, that is, a processing for determining a connection priority is described with reference to FIG. 19. This processing is carried out in the authentication/access policy management server 201. First, the authentication/access policy management server 201 identifies the requesting service by using the called party address of the received connection request (Step S191). This step is identical with the step S161.

Then, it determines whether or not the requesting service is an emergency call (Step S193). This step is identical with the step S163. When the requesting service is an emergency call, it determines the connection priority as compulsively accepting the connection request (Step S203). When a normal priority is set in a case where the requesting service is not any emergency call, it is said that the connection priority is increased. After that, the processing returns to the original calling processing.

On the other hand, when the requesting service is not any emergency call, the authentication/access policy management server 201 identifies a default connection priority corresponding to the requesting service (Step S195). By suing the default connection priority table like the default authentication strength level table, in which the connection priority is defined so as to correspond to the requesting service, it identifies a default connection priority corresponding to the requesting service relating to the connection request.

Then, it identifies the abnormal level to be applied and the context type thereof on the basis of data stored in the abnormal level data storage (Step S197). When only one abnormal level is to be applied, that abnormal level is applied, and when plural abnormal levels can be applied, the highest abnormal level among them is applied, for example.

After that, the authentication/access policy management server 201 determines whether or the abnormal level to be applied is level III (that is, the emergency state level) (Step S199). When it is level III, it determines whether or not a combination of the source user ID or address and the called party user ID or address, which are related to the connection request, has already been registered in the sending and receiving registration table of the authentication/access policy management server 201 (Step S201).

When the combination has been registration, it determines the connection priority as compulsively accepting the connection request (Step S203). This is because the connection is supposed when the combination has been registered, and the communication as quick as possible is preferable in case of the emergency.

On the other hand, when the combination has not been registered, it determines the connection priority as compulsively rejecting the connection (Step S205). This is to prevent an illegal connection under cover of a disaster.

Moreover, when the abnormal level to be applied is not level III, it determines whether or not the abnormal level is level II (that is, the abnormal state level) (Step S207). When the abnormal level is level II, it determines whether or not the combination of the source user ID or address and the called party user ID or address, which are related to the connection request, has been registered in the sending and receiving registration table of the authentication/access policy management server 201 (Step S209).

When the combination has already been registered, the authentication/access policy management server 201 determines the connection priority to carry out a preferential connection in the network (Step S211). By setting the priority higher than the normal level, the connection processing in the network is preferentially carried out.

On the other hand, when the combination has not been registered, it determines a connection priority lower than the normal level, which is not preferential in the network (Step S213). By carrying out such a processing, the connection processing may be delayed, and may be blocked compulsively due to the congestion in the network.

In addition, when it is determined that the abnormal level is not level II, the abnormal level is level I. Therefore, the processing returns to the original calling processing without carrying out any processing, in order to apply the default connection priority identified in the step S195. However, any adjustment for the default connection priority can be made.

By carrying out such a processing, it is possible to set the connection priority corresponding to the abnormal level.

Incidentally, according to whether or not the source user ID and the destination user ID have already been registered, the authentication strength level or the connection priority may be increased or decreased. However, another condition may be employed. For example, the condition that a predetermined permission is given based on the called party user may be employed.

Next, another embodiment from the step S33 of FIG. 8 to the step S63 of FIG. 9 will be described with reference to FIG. 20.

The authentication/access policy management server 201 identifies an authentication server (for example, an authentication server A) carrying out an authentication processing required for the identified authentication strength level, and transmits the authentication request for the source user relating to the connection request to the identified authentication server (Step S221). The authentication request includes an address of the source user and the like. The authentication server A receives the authentication request from the authentication/access policy management server 201 (Step S223), and transmits a request of authentication information to the user terminal 101 of the source user (Step S225). The NW equipment 103 receives the request of the authentication information from the authentication server A, and transfers it to the user terminal 101 (Step S227). The user terminal 101 receives the request of the authentication information, and displays it on the display device (Step S229). The user watches the display device and inputs the required authentication information. The user terminal 101 accepts inputs of the authentication information from the user, and transmits the authentication information to the authentication server A (Step S231). Incidentally, data collected by a special device or a semiconductor chip provided in the user terminal 101 may be transmitted. The NW equipment 103 receives the authentication information from the user terminal 101, and transfers it to the authentication server A (Step S233).

The authentication server A receives the authentication information of the source user relating to the connection request (Step S235), and carries out an authentication processing using the authentication information (Step S237). Then, the authentication server A transmits the authentication processing result to the authentication/access policy management server 201 (Step S239). The authentication/access policy management server 201 receives the authentication processing result from the authentication server A, and stores it into the data storage (Step S241).

Thus, the authentication/access policy management server 201 only outputs the authentication request for the authentication server, and does not involve the authentication processing.

Figure 20:
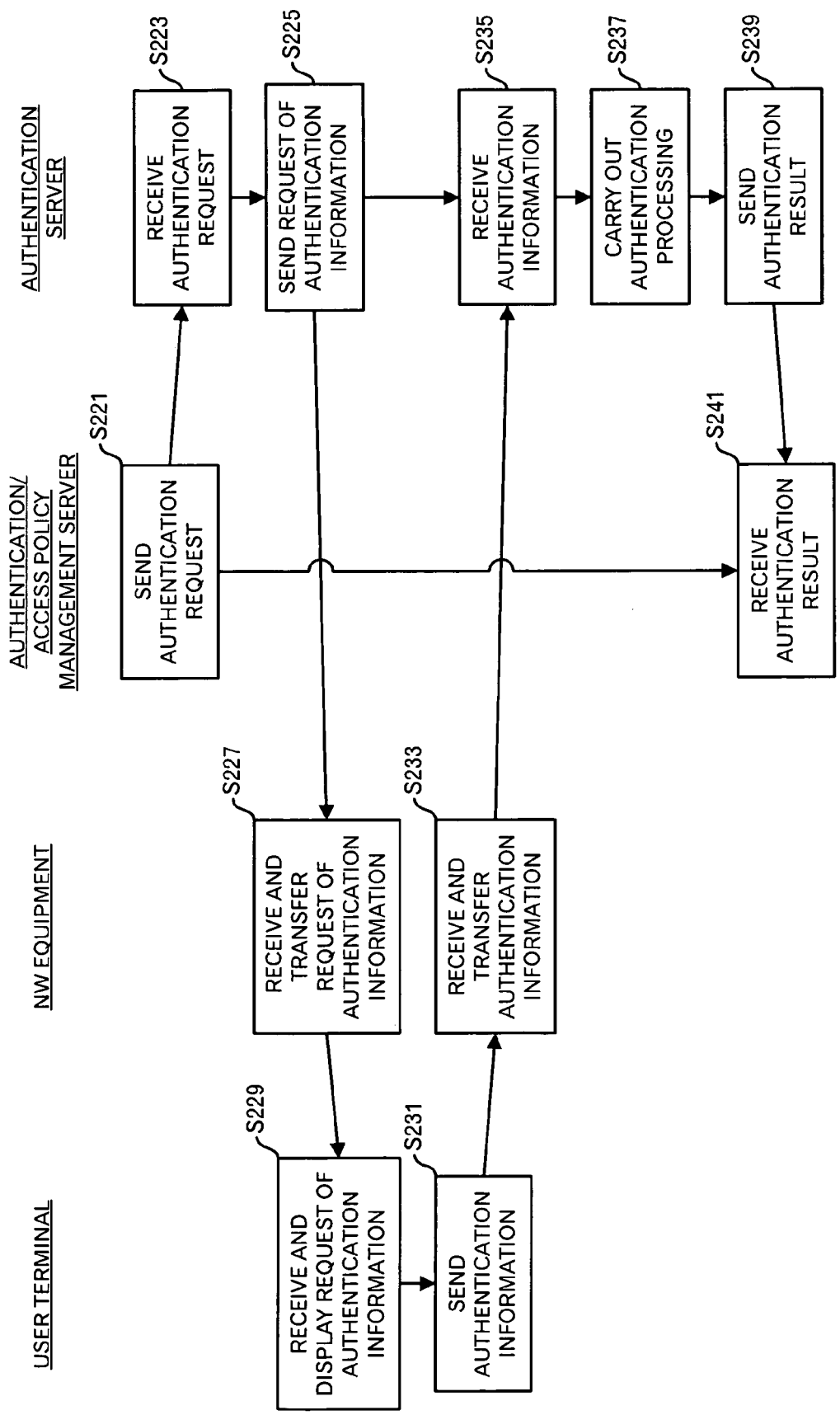
FIG. 20 is a diagram showing another processing flow relating to an authentication processing.

FIG. 20 shows a processing for one authentication server. Therefore, in a case where the identified authentication strength level requires plural authentication servers, the processing of FIG. 20 is carried out for each of the plural authentication servers. In general, the processing of FIG. 20 is carried out in parallel.

With the aforementioned configuration, it is possible to set an appropriate authentication strength level or connection priority according to the context relating to the abnormalities.

In addition, collection of the context and identification of the abnormal level can be carried out flexibly. Furthermore, various types of authentication server arrangements and authentication processings can be employed. Therefore, various network arrangements and devices can be coped with. In addition, in case of the abnormal state, the authentication strength level may be lowered or omitted for the communication request between the source and the destination, which have been registered while supposing the abnormal state, to process the request quickly. For other communication requests, it is possible to strengthen the authentication strength level higher than that for the normal times.

Although the embodiment of the present invention has been described, the present invention is not limited hereto. For example, the three-layered arrangement shown in FIG. 1 is an example and this arrangement is not necessary.

In addition, with respect to the aforementioned processing flow, in a case where exchanging the processing order does not change the processing result, the exchange of the processing order may be employed. Furthermore, when the default authentication strength level is identified, it is possible to identify the authentication strength level by further using the user ID of the source user in the connection request.

Figure 21:
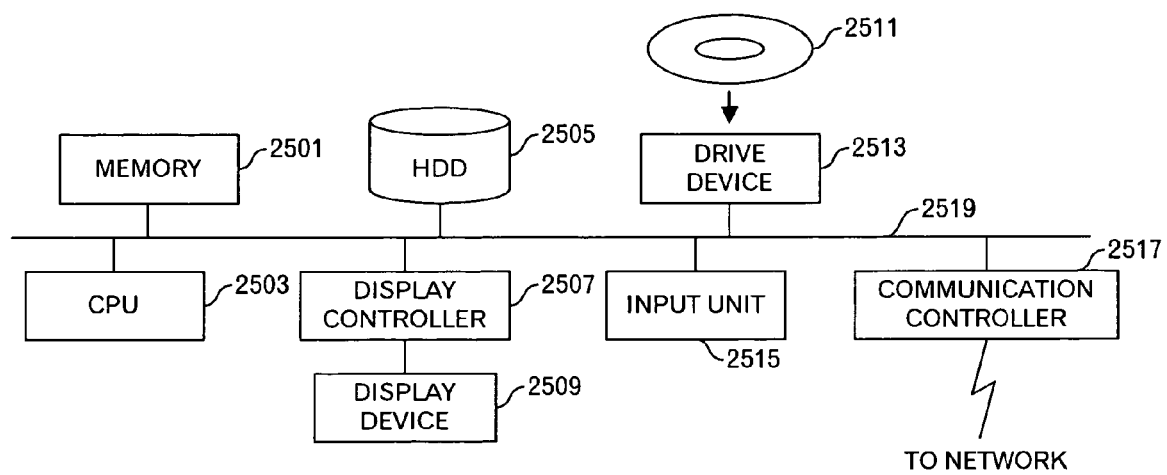
FIG. 21 is a functional block diagram of a computer.

In addition, the context management server 301, the authentication/access policy management server 201, the application server 108, and the user terminals 101 and 102 are computer devices as shown in FIG. 21. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 28. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:
1. A computer-implemented control method, comprising:
  identifying an abnormal level according to abnormal level reference data stored in advance in an abnormal level reference data storage, based on context data relating to abnormalities of occurring phenomenon, which has been collected in advance and stored in a context storage;

determining, according to a predetermined authentication strength level setting rule, an authentication strength level, based on the identified abnormal level and a called party wherein said predetermined authentication strength level setting rule based on whether or not combination of calling party and called party is preregistered includes a rule that said authentication strength level is lowered or heightened when said combination of said calling party and said called party has been registered, compared with a case when the combination of the calling party and the called party has not been registered; and causing an authentication server to carry out authentication processing corresponding to the determined authentication strength level.

2. The computer-implemented control method as set forth in claim 1, wherein said identifying is carried out by a policy management server, and said context storage is provided in a context management server, and said computer-implemented control method further comprises notifying said policy management server of data representing a change of said context data relating to said abnormalities of occurring phenomenon, which has been stored in said context storage, from said context management server.

3. The computer-implemented control method as set forth in claim 1, wherein said identifying is carried out by a policy management server, and said context storage is provided in a context management server, and said computer-implemented control method further comprises, in response to a request from said policy management server, transmitting, to said policy management server, data of said context data relating to said abnormalities of occurring phenomenon, which has been stored in said context storage, from said context management server.

4. The computer-implemented control method as set forth in claim 1, wherein said identifying is carried out by said context management server, and said converting and causing are carried out by the policy management server, and said computer-implemented control method further comprises transmitting said abnormal level identified in said identifying from said context management server to said policy management server.

5. The computer-implemented control method as set forth in claim 4, wherein said transmitting is carried out by said context management server in response to a request from said policy management server.

6. The computer-implemented control method as set forth in claim 1, further comprising: lowering said authentication strength level when the connection request is an emergency call.

7. The computer-implemented control method as set forth in claim 1, wherein said authentication strength level is defined by using at least one type of a user authentication, a device authentication, and an environment authentication.

8. The computer-implemented control method as set forth in claim 7, wherein said predetermined authentication strength level setting rule defines heightening or lowering a default authentication strength level, and when said authentication strength level is lowered, the number of authentication types defined for said authentication strength level is reduced, and when said authentication strength level is heightened, the number of authentication types defined for said authentication strength level is increased.

9. The computer-implemented control method as set forth in claim 7, wherein said predetermined authentication strength level setting rule defines heightening or lowering a default authentication strength level, and when said authentication strength level is lowered, a level in a predefined authentication type to be used is lowered, and when said authentication strength level is heightened, a level in said predefined authentication type to be used is heightened.

10. The computer-implemented control method as set forth in claim 1, wherein said predetermined authentication strength level setting rule is defined to select one of authentication patterns respectively registered in association with predefined cases including an abnormal level as a condition.

11. The computer-implemented control method as set forth in claim 7, wherein said environment authentication includes confirming at least one of a type of an operating system, a version of said operating system, a virus detection capability, a phishing detection capability, and a device performance or capacity.

12. The computer-implemented control method as set forth in claim 1, wherein said authentication server includes individual servers, each carrying out an authentication processing required for each authentication type or level, and said causing comprises selecting an individual server for said authentication type or level corresponding to the identified authentication strength level, by said a policy management server that carries out said causing.

13. The computer-implemented control method as set forth in claim 12, further comprising:

transmitting a request of authentication information required in the identified authentication strength level to a terminal of a calling party by said policy management server; and transmitting said authentication information received from said terminal of said calling party to the selected individual server by said policy management server.

14. The computer-implemented control method as set forth in claim 12, further comprising:

transmitting an authentication request to the selected individual server by said policy management server; and transmitting a request of necessary authentication information to a terminal of a calling party from said selected individual server.

15. A computer-implemented control method, comprising:

identifying an abnormal level according to abnormal level reference data stored in advance in an abnormal level reference data storage, based on context data relating to abnormalities of occurring phenomenon, which has been collected in advance and stored in a context storage;

determining, according to a predetermined connection control rule, a connection priority among a plurality of connection priorities including forcible rejection and acceptance of a connection setup request, based on the identified abnormal level and a called party wherein said predetermined connection control rule based on whether or not combination of calling party and called party is preregistered includes a rule that said connection priority is lowered or heightened when said combination of said calling party and said called party has been registered, compared with a case when the combination of the calling party and the called party has not been registered; and causing an equipment to carryout connection control according to the determined connection priority.

16. The computer-implemented control method as set forth in claim 15, further comprising: compulsively accepting a connection request when the connection request is an emergency call.

17. A computer-readable storage medium storing a program for causing a computer to carry out a control process, comprising:

identifying an abnormal level according to abnormal level reference data stored in advance in an abnormal level reference data storage, from based on context data relating to abnormalities of occurring phenomenon, which has been collected in advance and stored in a context storage;

determining, according to a predetermined authentication strength level setting rule, an authentication strength level, based on the identified abnormal level and a called party wherein said predetermined authentication strength level setting rule based on whether or not combination of calling party and called party is preregistered includes a rule that said authentication strength level is lowered or heightened when said combination of said calling party and said called party has been registered, compared with a case when the combination of the calling party and the called party has not been registered; and causing an authentication server to carry out authentication processing corresponding to the identified authentication strength level.

18. A computer-readable storage medium storing a program for causing a computer to carry out a control process, comprising:

identifying an abnormal level according to abnormal level reference data stored in advance in an abnormal level reference data storage, from based on context data relating to abnormalities of occurring phenomenon, which has been collected in advance and stored in a context storage;

determining, according to a predetermined connection control rule, a connection priority among a plurality of connection priorities including reject forcible rejection and acceptance of a connection setup request, based on the identified abnormal level and a called party wherein said predetermined connection control rule based on whether or not combination of calling party and called party is preregistered includes a rule that said connection priority is lowered or heightened when said combination of said calling party and said called party has been registered, compared with a case when the combination of the calling party and the called party has not been registered; and causing an equipment to carry out connection control according to the determined connection priority.

19. A control apparatus, comprising:

a memory to store abnormal level reference data;

a first unit to identify an abnormal level according to said abnormal level reference data stored in said memory, from based on context data relating to abnormalities of occurring phenomenon, which has been collected in advance and stored in a context storage; and a second unit to determine, according to a predetermined authentication strength level setting rule, an authentication strength level, based on the identified abnormal level and a called party wherein said predetermined authentication strength level setting rule based on whether or not combination of calling party and called party is preregistered includes a rule that said authentication strength level is lowered or heightened when said combination of said calling party and said called party has been registered, compared with a case when the combination of the calling party and the called party has not been registered and to cause an authentication server to carry out an authentication processing corresponding to the determined authentication strength level.

20. A control apparatus, comprising:

a memory to store abnormal level reference data;

a first unit to identify an abnormal level according to said abnormal level reference data stored in said memory, from based on context data relating to abnormalities of occurring phenomenon, which has been collected in advance and stored in a context storage; and a second unit to determine, according to a predetermined connection control rule, a connection priority among a plurality of connection priorities including reject forcible rejection and acceptance of a connection setup request, based on the identified abnormal level and a called party wherein said predetermined connection control rule based on whether or not combination of calling party and called party is preregistered includes a rule that said connection priority is lowered or heightened when said combination of said calling party and said called party has been registered, compared with a case when the combination of the calling party and the called party has not been registered; and to cause an equipment to carry out connection control according to the determined connection priority.

* * * * *

UNITED STATES PATENT AND TRADEMARK OFFICE
CERTIFICATE OF CORRECTION

| | | |
|---|---|---|
| PATENT NO. | : 8,056,116 B2 | Page 1 of 1 |
| APPLICATION NO. | : 11/297334 | |
| DATED | : November 8, 2011 | |
| INVENTOR(S) | : Masafumi Katoh et al. | |

It is certified that error appears in the above-identified patent and that said Letters Patent is hereby corrected as shown below:

Column 22, Line 28, In Claim 12, after "by" delete "said".

Column 23, Line 11 (Approx.), In Claim 17, after "storage," delete "from".

Column 23, Line 36 (Approx.), In Claim 18, after "storage," delete "from".

Column 23, Line 42 (Approx.), In Claim 18, after "including" delete "reject".

Column 24, Line 10 (Approx.), In Claim 19, after "memory," delete "from".

Column 24, Line 23, In Claim 19, after "registered" insert -- , --.

Column 24, Line 30, In Claim 20, before "based" delete "from".

Column 24, Line 35, In Claim 20, after "including" delete "reject".

Signed and Sealed this
Seventh Day of February, 2012

David J. Kappos
*Director of the United States Patent and Trademark Office*